US011927294B2

(12) United States Patent
Burggraaff et al.

(10) Patent No.: US 11,927,294 B2
(45) Date of Patent: Mar. 12, 2024

(54) HEADER DELIVERY SYSTEM

(71) Applicant: Quest Integrity Group, LLC, Sugar Land, TX (US)

(72) Inventors: Maarten Cornelis Burggraaff, Sugar Land, TX (US); Willem Meerkerk, Sugar Land, TX (US)

(73) Assignee: QUEST INTEGRITY GROUP, LLC, Stafford, TX (US)

(*) Notice: Subject to any disclaimer, the term of this patent is extended or adjusted under 35 U.S.C. 154(b) by 348 days.

(21) Appl. No.: 17/430,720

(22) PCT Filed: Feb. 19, 2020

(86) PCT No.: PCT/US2020/018837
§ 371 (c)(1),
(2) Date: Aug. 12, 2021

(87) PCT Pub. No.: WO2020/172283
PCT Pub. Date: Aug. 27, 2020

(65) Prior Publication Data
US 2022/0136638 A1    May 5, 2022

Related U.S. Application Data

(60) Provisional application No. 62/808,076, filed on Feb. 20, 2019.

(51) Int. Cl.
*F16L 55/46* (2006.01)
*B05B 12/14* (2006.01)

(52) U.S. Cl.
CPC .......... *F16L 55/46* (2013.01); *B05B 12/1481* (2013.01)

(58) Field of Classification Search
CPC ..................................................... F16L 55/46
See application file for complete search history.

(56) References Cited

U.S. PATENT DOCUMENTS 8,733,187 B2    5/2014  Loftstrom
11,719,377 B2*  8/2023  Meerkerk ............. F28F 9/0246
                                                    137/15.09
(Continued)

FOREIGN PATENT DOCUMENTS

EP    3543585 A1    9/2019
GB    2195739 A     4/1988
(Continued)

OTHER PUBLICATIONS

Office Action in related application CA 3,130,891 dated Jan. 19, 2023.
(Continued)

*Primary Examiner* — Michael R Reid
(74) *Attorney, Agent, or Firm* — Patterson + Sheridan, LLP

(57) ABSTRACT

A header delivery system and method for performing a pigging operation on a process tube connected at an angle to a header pipe. The header delivery system includes a base assembly coupled to a rotation assembly. The base assembly has a frame member supporting a launcher pipe coupled to a tube coupler and a jack apparatus. The rotation assembly is configured to position the base assembly with respect to the rotation assembly to adjust an angular position of the base assembly. The header delivery system may be aligned with a process tube in the header pipe and the jack apparatus may position the tube coupler from a first retracted position to an extended position to form a seal between the tube coupler and the first process tube. A service operation may be performed on the first process tube with the tube coupler in the extended position.

18 Claims, 15 Drawing Sheets

(56) References Cited

U.S. PATENT DOCUMENTS

2012/0291939 A1   11/2012   Warren et al.
2013/0276558 A1   10/2013   Loftstrom
2014/0069512 A1   3/2014    McNabney

FOREIGN PATENT DOCUMENTS

JP        S61165597 A       7/1986
KR   10-2017-0099203 A      8/2017
WO       2013030353 A1      3/2013

OTHER PUBLICATIONS

International Report on Patentability in related application PCT/US2020/018837 dated Aug. 10, 2021.
International Search Report and Written Opinion in related application PCT/US2020/018837 dated Apr. 29, 2020.
Third Party Observation in related application PCT/US2020/018837 dated Feb. 7, 2021.
Third Party Observation in related application PCT/US2020/018837 dated Aug. 26, 2021.
Extended European Search Report in related application GB20760335.8 dated Sep. 30, 2022.

* cited by examiner

HEADER DELIVERY SYSTEM

This application is a National Phase filing under 35 U.S.C. § 371 of International Application PCT/US2020/018837, filed on Feb. 19, 2020, which claims priority to U.S. Provisional Patent Application Ser. No. 62/808,076, filed Feb. 20, 2020, entitled "UNIVERSAL HEADER DELIVERY SYSTEM", each of which is incorporated herein by reference for all purposes.

FIELD OF INVENTION

In general, the disclosure describes a system and methodology for a header delivery system for a header pipe for performing an operation on process tubes connected to a header pipe.

BACKGROUND OF INVENTION

Pigging of pipes or pipelines is performed to remove internal fouling, to inspect for defects in a pipe or to map the geographic location of the pipe. Pigging is done by pumping a device, i.e. a pig, through a pipe. Intelligent pigs have sensors that can record information on the condition of the pipe.

One example use of pigs is in cleaning fired heaters that are used in industries such as power and oil and gas. Fired heaters are typically insulated enclosures that use heat created by the combustion of fuels to heat fluids contained within coils, tubes, pipes, or the like. The type of fired heater is generally described by the structural configuration, the radiant tube coil configuration and the burner arrangement.

Over time, the internal coils/tubes/pipes of the fired heater are subject to pollution and wear during their work cycle. The internal coils/tubes/pipes may become internally fouled with coke. Coke is ash made of carbon fragments that lays down and coats the interior of the coils/tubes/pipes. Coke deposits drop out of the process stream if/when the stream gets too hot and starts to thermally degrade. Decoking is the industry term used to describe the process of removing coke or other types of internal fouling from a fired heater's inner pipes/tubes/coils. Presently, decoking is done by the use of conveying cleaning pigs through the pipes/tubes/coils.

When cleaning or inspecting furnaces, the furnaces may contain one or more manifolds, or header pipes. A header pipe has process tubes connected to the header pipe at one or more angular positions around the header pipe. To enable the pigging company to perform an operation to clean or inspect the furnace, there needs to be a temporary header delivery system (HDS) installed in the header pipes to access one or more process tubes. In many cases, this is a custom build hydraulic apparatus that is placed inside the header pipe. The build of a header delivery system is costly and time consuming as it is generally custom built.

What is needed, is a more time and cost effective system and methodology to enable the performance of pigging and other operations on process tubes connected to a header pipe without the necessity of a custom built header delivery system.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

An embodiment of the present disclosure provides a header delivery system for a header pipe having a process tube extending from the header pipe. The header delivery system includes a base assembly coupled to a rotation assembly. The base assembly includes a launcher pipe having a first pipe end and a second pipe end with the first pipe end having a first launcher pipe opening and the second pipe end having a second launcher pipe opening, a tube coupler connected to the first launcher pipe opening, a first frame member coupled to the launcher pipe and having a first frame end and a second frame end, and a jack apparatus connected to the tube coupler and configured to adjustably position the tube coupler. The rotation assembly including a first rotation apparatus connected to the first frame member at the first frame end and a second rotation apparatus connected to the first frame member at the second frame end. The first rotation apparatus and the second rotation apparatus configured to position the base assembly with respect to the rotation assembly to adjust an angular position of the base assembly.

An embodiment of the present disclosure provides a method of accessing a process tube extending from a header pipe using a header delivery system. The method includes determining a first tube angular position of a first process tube in a first header pipe; positioning the base assembly with respect to the first rotation apparatus and the second rotation apparatus to position the header delivery system in a first angular position; connecting the base assembly to the first rotation apparatus and the second rotation apparatus to fix the header delivery system in the first angular position; after fixing the header delivery system in the first angular position, inserting the header delivery system in the first header pipe with the tube coupler in a retracted position; aligning the header delivery system in the first header pipe with the first process tube in an alignment position and with the tube coupler in the retracted position; and after aligning the header delivery system, actuating the jack apparatus to position the tube coupler from the retracted position to the extended position to form a seal between the tube coupler and the first process tube; and performing a first service operation on the first process tube with the tube coupler in the extended position using the launcher pipe to access the first process tube.

An embodiment of the present disclosure provides a header delivery system for a header pipe having a process tube extending from the header pipe. The header delivery system including a base assembly coupled to a rotation assembly. The base assembly including a first frame member having a first frame end and a second frame end, a second frame member spaced apart from the first frame member and having a third frame end and a fourth frame end, a jack apparatus connected between the first frame member and the second frame member, a launcher pipe connected to the jack apparatus, a tube coupler connected to the jack apparatus, and a bumper connected to the jack apparatus. The jack apparatus is configured to adjustably move the tube coupler and the bumper in opposite radial directions when moving between a retracted position and an extended position. The rotation assembly including a first rotation apparatus connected to the first frame member at the first frame end and the second frame member at the third frame end, and a second rotation apparatus connected to the first frame member at the second frame end and the second frame member at a fourth frame end. The first rotation apparatus and the second rotation apparatus configured to rotate the base assembly with respect to the rotation assembly to adjust an angular position of the tube coupler and the bumper.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
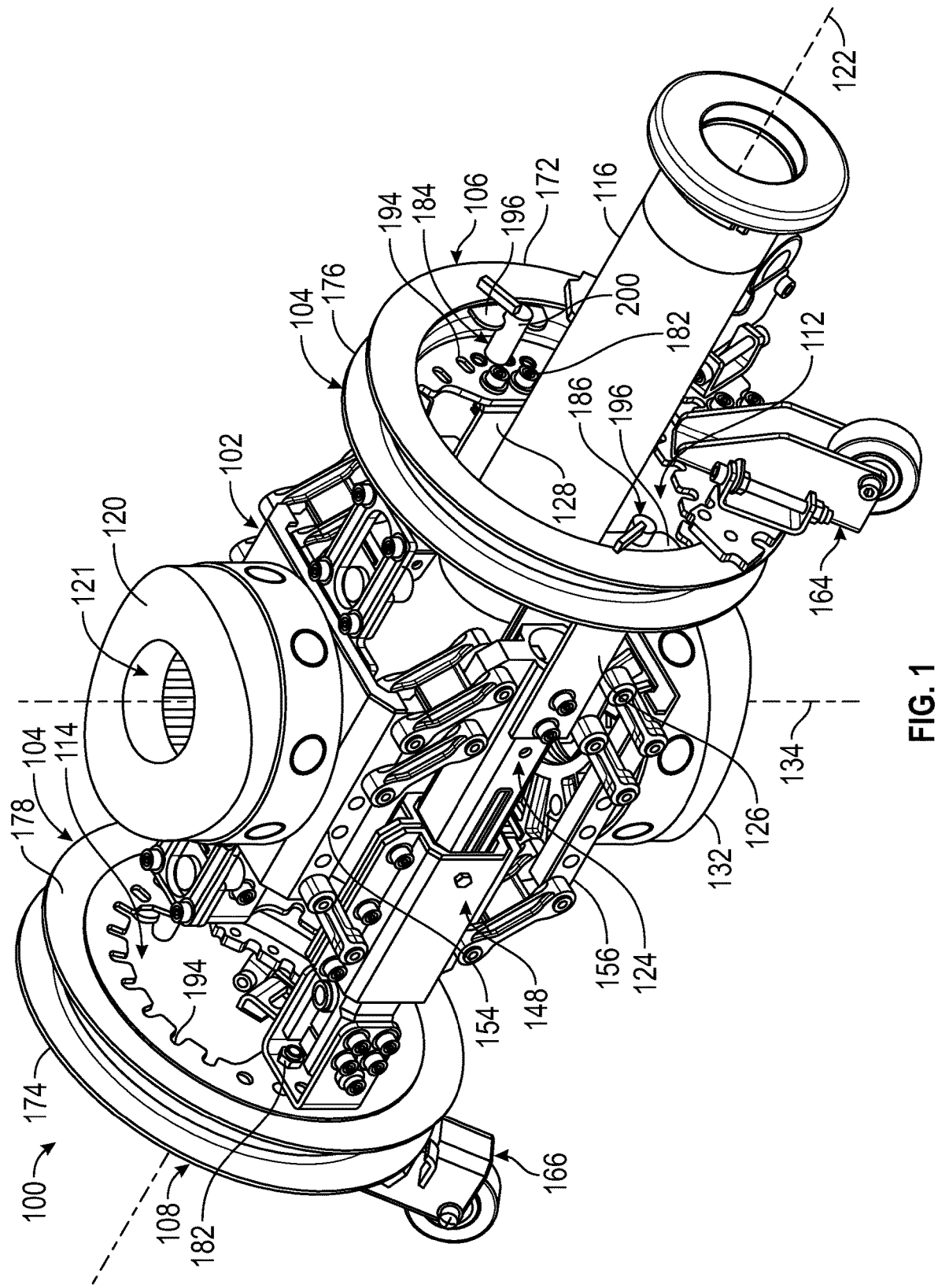
FIG. 1 is a perspective view of a header delivery system according to embodiments of the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. As used herein, the terms "coils", "pipes", and "tubes" are used individually or in combination to mean the internal fluid carrying elements of a fired heater.

The present disclosure generally relates to a system and method addressing the cost and time inefficiencies of using a custom header delivery system to enable a pigging operation for a process tube on a header pipe. Embodiments of the header delivery system of the present disclosure include a universal header delivery system that includes a hydraulically-actuated base assembly. The base assembly may be rotated with respect to a rotation assembly to adjustably align the header delivery system with a process tube to seal with a process tube that may be connected to the header pipe at different angular positions. The header pipe has a larger diameter than the diameter of the connected process tubes. In addition, components of the header delivery system are modular and may be replaced with different components that may be in a variety of shapes or sizes to accommodate header pipes and connected process pipes of different sizes. By adding different sized and shaped couplings and other accessories to the base assembly, the header delivery system of the present disclosure can accommodate a wide range of sizes of header pipes and process tubes, and thus be adjusted as needed to perform pigging services for a furnace requiring a service operation.

The header delivery system of the present disclosure enables quick response to perform pigging operations as the need to custom build a header delivery system is eliminated. The response time may be reduced from a couple of weeks of designing, manufacturing and testing the custom header delivery system to the amount of time needed to send the universal header delivery system to location.

Referring to FIG. 1, a header delivery system 100 is shown. Header delivery system 100 includes a base assembly 102 connected to a rotation assembly 104 formed by a first rotation apparatus 106 and a second rotation apparatus 108 spaced from one another. First rotation apparatus 106 has a first ring opening 112 and the second rotation apparatus 108 has a second ring opening 114. Base assembly 102 is attached between the rotation apparatuses 104, 106.

Base assembly 102 includes a launcher pipe 116 sealingly coupled at one end to a tube coupler 120 having a coupler opening 121. In some embodiments, the tube coupler 120 may have a curved outer surface configured to conform to a curved surface of the inner diameter of a header pipe. In some embodiments, the tube coupler 120 may have a curved outer surface of a different radius or a flat outer surface configured to conform to the internal surface of the header pipe. In some embodiments, the tube coupler 120 may be made of a resilient material configured to form a seal.

Launcher pipe 116 extends though the first ring opening 112. A first axis 122 extends through the ring openings 112, 114. First axis 122 may extend through a centerline of the rotation apparatuses 104, 106, as shown in FIG. 1. In some embodiments, the first axis 122 may extend through a centerline of the ring openings 112, 114. In some embodiments, the first axis 122 may extend through a centerline of the base assembly 102. In some embodiments, the first axis 122 may extend through the launcher pipe 116.

Base assembly 102 includes a frame apparatus 124 formed by a first frame member 126 and a second frame member 128 that each have an elongated shape and are spaced from one another. Each frame member 126, 128 has one end attached to the first rotation apparatus 106 and an opposite end attached to the second rotation apparatus 108. Frame members 126, 128 may be parallel to each other. A bumper 132 is connected to the second mounting plate 156 and is disposed opposite the tube coupler 120 with the bumper 132 and the tube coupler 120 disposed on opposite sides of the frame apparatus 124 and frame members 126, 128. A second axis 134 extends through the tube coupler 120 and the bumper 132. Bumper 132 may be formed by a tube coupler that is like the tube coupler 120. In some embodiments, the tube coupler forming the bumper 132 is identical to the tube coupler 120. Using a bumper 132 that is like the tube coupler 120 has the benefit of reducing the number of different parts used for the header delivery system 100.

Tube coupler 120 may be connected to a first mounting plate 154 and the bumper 132 may be connected to a second mounting plate 156. Mounting plates 154, 156 form part of a jack apparatus 148 for radially positioning the tube coupler 120 and the bumper 132 radially with respect to first axis 122, as further described with respect to FIG. 4. For example, the tube coupler 120 and bumper 132 connected respectively to mounting plates 154, 156 may be positioned outwardly from a retracted position to an extended position. Jack apparatus 148 may be hydraulically powered. In some embodiments, jack apparatus 148 may be mechanically powered.

Figure 2:
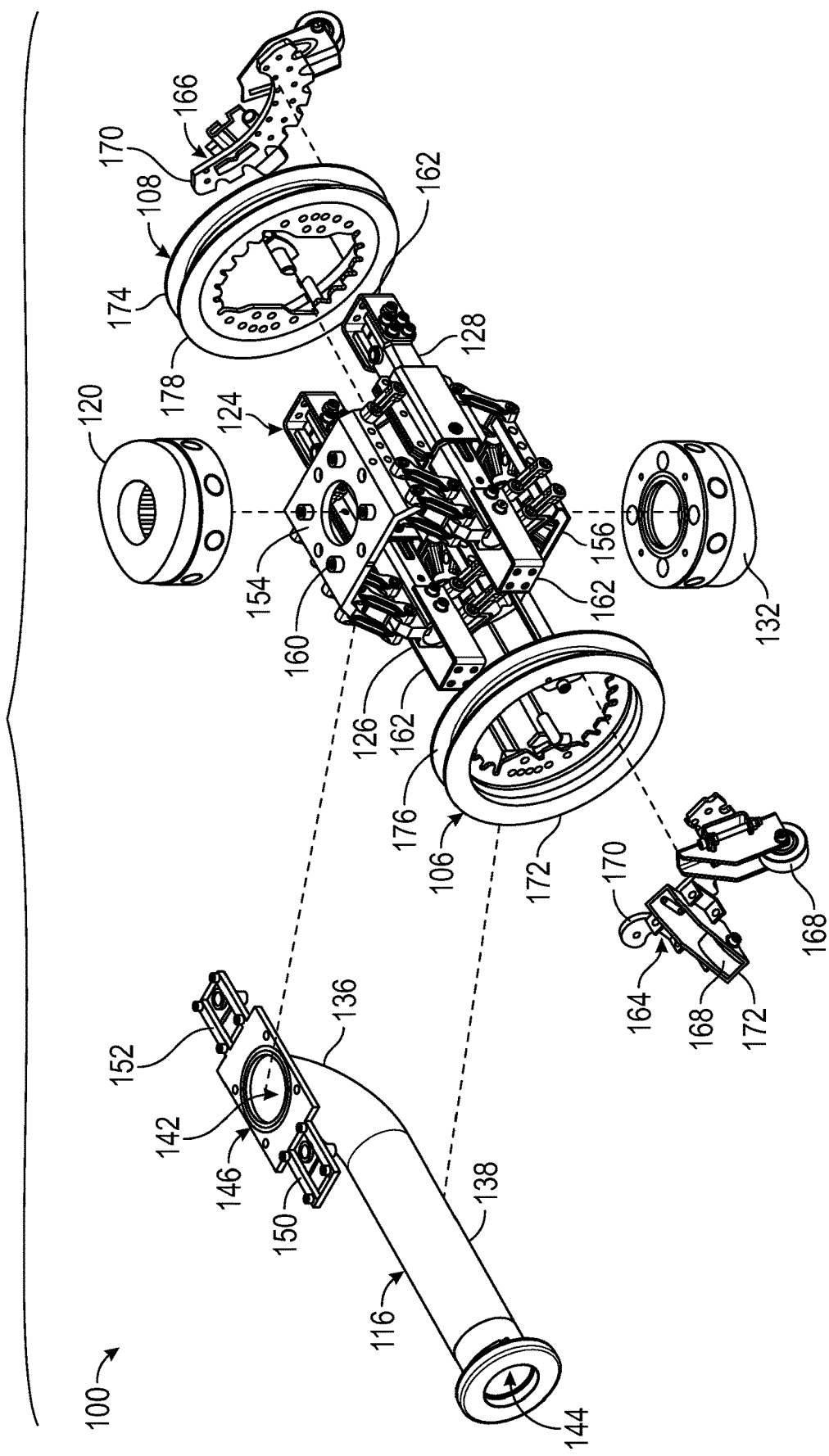
FIG. 2 is an exploded view of the header delivery system according to embodiments of the present disclosure.

Referring to FIG. 2, an exploded view of the header delivery system 100 is shown. Launcher pipe 116 is shown separated from the frame apparatus 124. Launcher pipe 116 has a first pipe section 136 and a second pipe section 138 that may be connected, for example by welding. First pipe section 136 forms a first pipe opening 142 and the second pipe section 138 forms a second pipe opening 144. An accessory member 146 may be attached to the launcher pipe 116 adjacent the first pipe opening 142. Accessory member 146 has a first accessory mount member 150 and a second accessory mount member 152. A camera, not shown, may be adjustably mounted on each of the accessory mount members 150, 152 to position cameras on opposite sides of the second pipe opening 142.

Tube coupler 120 and bumper 132 are shown separated from the frame apparatus 124 in FIG. 2. Launcher pipe 116 may be connected to the frame assembly 124 by attaching the launcher pipe 116 to the first mounting plate 154. Mechanical fasteners, such as bolts 160, may be used to attach the launcher pipe 116 to the first mounting plate 154. Tube coupler 120 may be attached to the first mounting plate 154 with mechanical fasteners, such as bolts 160. Bumper 132 may be attached to the second mounting plate 156 with mechanical fasteners, such as bolts.

First rotation apparatus 106 is shown separated from one end of the frame apparatus 124 and second rotation apparatus 108 is shown separated from an opposite end of the frame apparatus 124 in FIG. 2. Frame members 126, 128 may each have frame connector members 162 on opposite ends to connect the frame members 126, 128 to the rotation apparatuses 106, 108. A first wheel apparatus 164 may be connected to the first rotation apparatus 106 and a second wheel apparatus 166 may be connected to the second rotation apparatus 108. Wheel apparatuses 164, 166 each include a wheel support plate 170 and wheels 168 connected to the wheel support plate 170. A wheel support plate 170 with attached wheels 168 may be connected to each of the rotation apparatuses 106, 108.

Referring to FIGS. 1-2, the first rotation apparatus 106 includes a first stationary ring 172 and the second rotation apparatus 108 includes a second stationary ring 174. Stationary rings 172, 174 are each connected to a respective wheel apparatuses 164, 166. Wheel apparatuses 164, 162 connected to the stationary rings 172, 174 are used to move the header delivery system 100 along a bottom surface, such as an internal diameter of a header pipe.

First rotation apparatus 106 includes a first rotational ring 176 and the second rotation apparatus 108 includes a second rotational ring 178. First rotational ring 176 is connected to a first frame end and the second rotational ring 178 is connected to a second frame end of the frame apparatus 124. Mechanical fasteners, such as bolts 182, may be used to fix the rotational rings 176, 178 to a respective frame end. First rotational ring 176 is rotatably connected to the first stationary ring 172. Second rotational ring 178 is rotatably connected to the second stationary ring 174. In some embodiments, the first rotational ring 176 rotatably connected to the first stationary ring 172 is formed by a slewing ring and the second rotational ring 178 rotatably connected to the second stationary ring 174 is formed by another slewing ring.

With the frame apparatus 124 connected to each of the rotational rings 176, 178, the base assembly 102 may be rotated with respect to the first axis 122 by rotating the rotational rings 176, 178 each connected to one of the stationary rings 172, 174. Rotating the base assembly 102 positions the tube coupler 120 in a selected angular position with respect to the first axis 122. For example, the base assembly 102 may be positioned in the selected angular position so that the tube coupler 120 is positioned to be coupled to a process tube connected to the header pipe. A header pipe may also be referred to as a manifold.

First rotation apparatus 106 has a first locking assembly formed by a first locking apparatus 184 and a second locking apparatus 186 configured to selectively fix the first rotational ring 176 to the first stationary ring 172, as shown in FIG. 1. Second rotation apparatus 108 has a second locking assembly formed by a third locking apparatus 188 and a fourth locking apparatus 190 configured to selectively fix the second rotational ring 178 to the second stationary ring 174. See FIG. 3 for a view of the locking apparatuses 188, 190.

Figure 3:
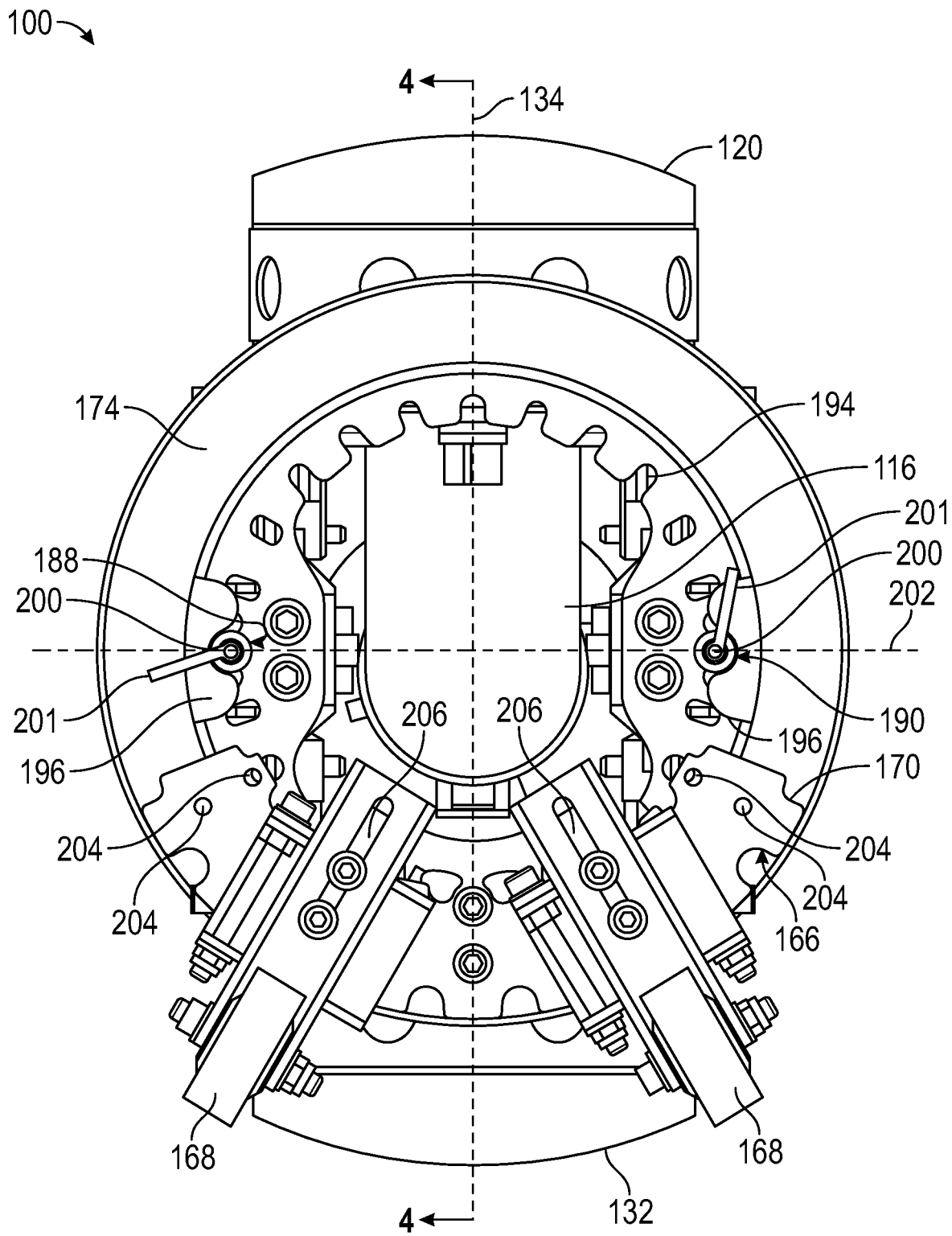
FIG. 3 is a back view of the header delivery system according to embodiments of the present disclosure.

Locking apparatuses 184-190 may be used to fix the tube coupler 120 in a selected angular position with respect to the first axis 122. Locking apparatuses 184-190 are configured to adjustably fix the tube coupler 120 in a plurality of angular positions. A pair of lock brackets 196 are attached to each of the stationary rings 172, 174, as shown in FIG. 3. Each of the locking apparatuses 184-190 may be attached to one of the brackets 196. Each of the locking apparatuses 184-190 may have an elongated shape and have a pin 200.

Referring to FIGS. 1-3, the rotational rings 176, 178 have a plurality of ring lock slots 194 that extend around the periphery of the ring openings 112, 114. Locking apparatuses 184-190 are configured to couple with a selected one of the ring lock slots 194 to fix the rotational rings 176, 178 to a respective stationary ring 174, 176. Each pin 200 extends though one of the ring lock slots 194 on a rotational ring 176, 178 to fix the rotational rings 176, 178 to a respective stationary ring 174, 176 to prevent rotation of the rotational rings 176, 178 with respect to the stationary rings 172, 174. Pins 200 prevent rotation of the rotational rings 176, 178 with respect to the stationary rings 172, 174. Pin 200 may be spring-loaded and biased in an extended position. An adjustment arm 201 may be connected to the pin 200 to move the pin 200 from the extended position to a non-extended position.

When the rotational rings 176, 178 each are fixed to its respective rotation apparatuses 106, 108, the base assembly 102 is fixed in a selected angular position. Pins 200 each may be removed from ring lock slots 194 to enable the rotation of the rotational rings 176, 178 with respect to the stationary ring 174, 176 to enable rotation of the base assembly 102 and adjustment of the angular position of the base assembly 102 and the connected tube coupler 120. In this manner, the tube coupler 120 may be positioned and locked in a plurality of different angular positions.

Referring to FIG. 3, a back view of the header delivery system 100 is shown. Tube coupler 120 is positioned in a vertical position and the second axis 134 extends through the tube coupler 120 and the bumper 132. Tube coupler 120 and the bumper 132 may be at an angular position of zero degrees. Second axis 134 is perpendicular to a horizontal axis 202. Second wheel apparatus 166 is shown attached to the second stationary ring 174. Wheel plate 170 has multiple angular wheel slots 204 for positioning the wheels 168 at different angular positions. Second wheel apparatus 166 has radial wheel slots 206 for adjusting the radial position of the wheels 168.

Figure 4:
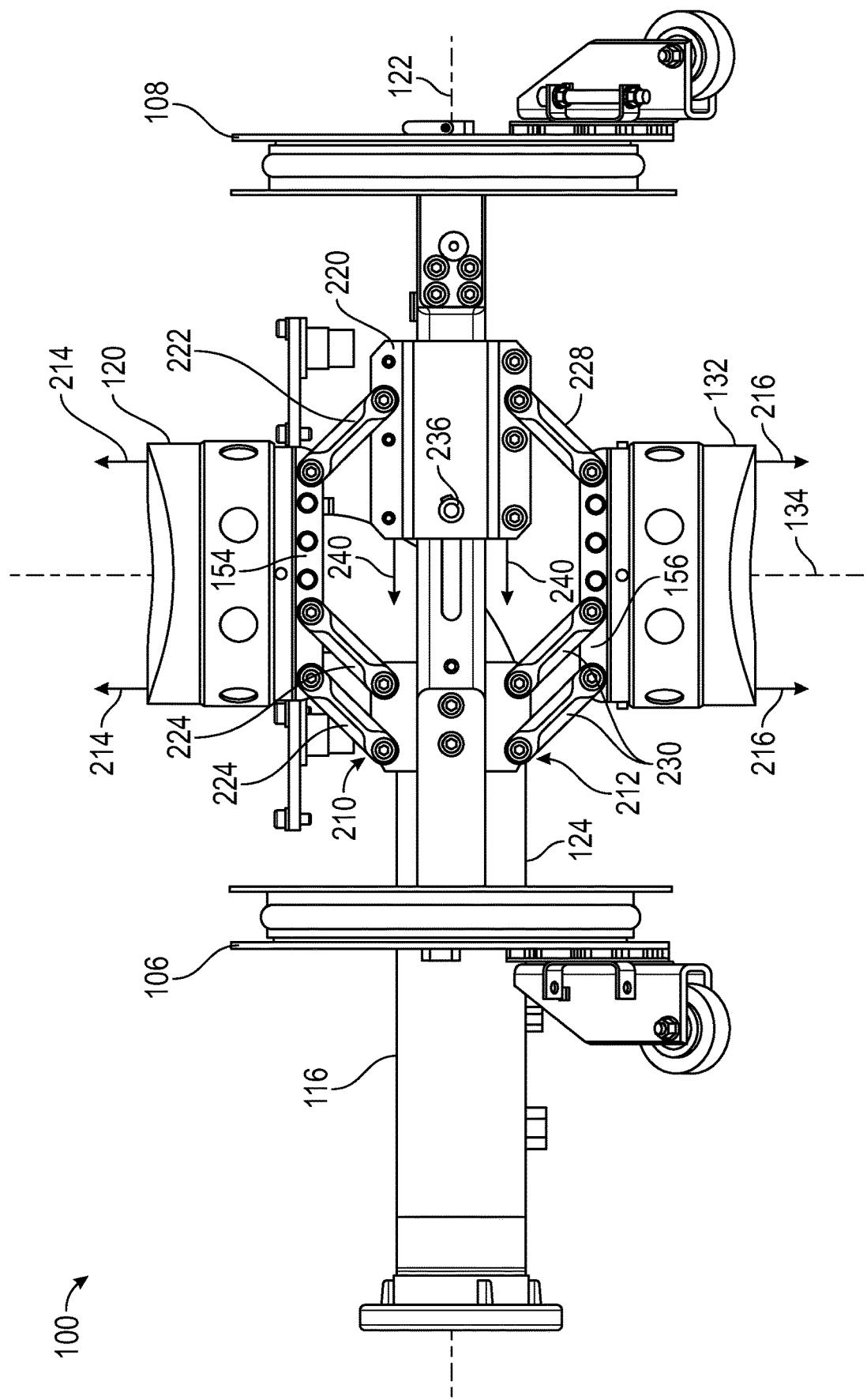
FIG. 4 is a side view of the header delivery system according to embodiments of the present disclosure.

Referring to FIG. 4, a side view of the header delivery system 100 is shown. Tube coupler 120 is connected to the first mount plate 154 and the bumper 132 is connected to the second mount plate 156. Tube coupler 120 connected to the first mount plate 154 and bumper 132 connected to second mount plate 156 may be positioned outwardly from the first axis 122 in opposite directions along the second axis 134 from a retracted position to an extended position. A first extension assembly 210 is connected to the first mounting plate 154 and is configured to position the first mounting plate 154 in a first radial direction from a retracted position to an extended position. The first radial direction of the first mounting plate 154 connected to the tube coupler 120 is indicated by the arrows 214. A second extension assembly 212 is connected to the second mounting plate 156 and is configured to position the second mounting plate 156 in a second radial direction from a retracted position to an extended position. The second radial direction of the second mounting plate 156 connected to the bumper 132 is indicated by the arrows 216.

Tube coupler 120 and the bumper 132 move opposite one another when moving from a retracted position to an extended position and the movement is in an axial direction along the second axis 134. When in either the retracted position or the extended position, the tube coupler 120 and the bumper 132 may have equal distances from the first axis 122. The distance between tube coupler 120 and the bumper 132 along second axis 134 increases when the jack apparatus 148 positions the header delivery system 100 from a retracted position to an extended position. Second axis 134 may shift in a direction perpendicular to the second axis 134 as the jack apparatus 148 positions the header delivery system 100 from a retracted position to an extended position.

First extension assembly 210 includes a first carrier member 220, a first carrier arm 222, and a pair of first pivot arms 224. First carrier member 220 is movably connected to the frame apparatus 124. First carrier arm 222 is pivotally connected at one end to the first carrier member 220 and pivotally connected at an opposite end to the first mount member 154. First pivot arms 224 are pivotally connected at one end to the frame apparatus 124 and pivotally connected at the opposite end to the first mount member 154.

Second extension assembly 212 includes the first carrier member 220, a second carrier arm 228, and a pair of second pivot arms 230. Second carrier arm 228 is pivotally connected at one end to the first carrier member 220 and pivotally connected at an opposite end to the second mount member 156. Second pivot arms 230 are pivotally connected at one end to the frame apparatus 124 and pivotally connected at the opposite end to the second mount member 156.

Figure 6:
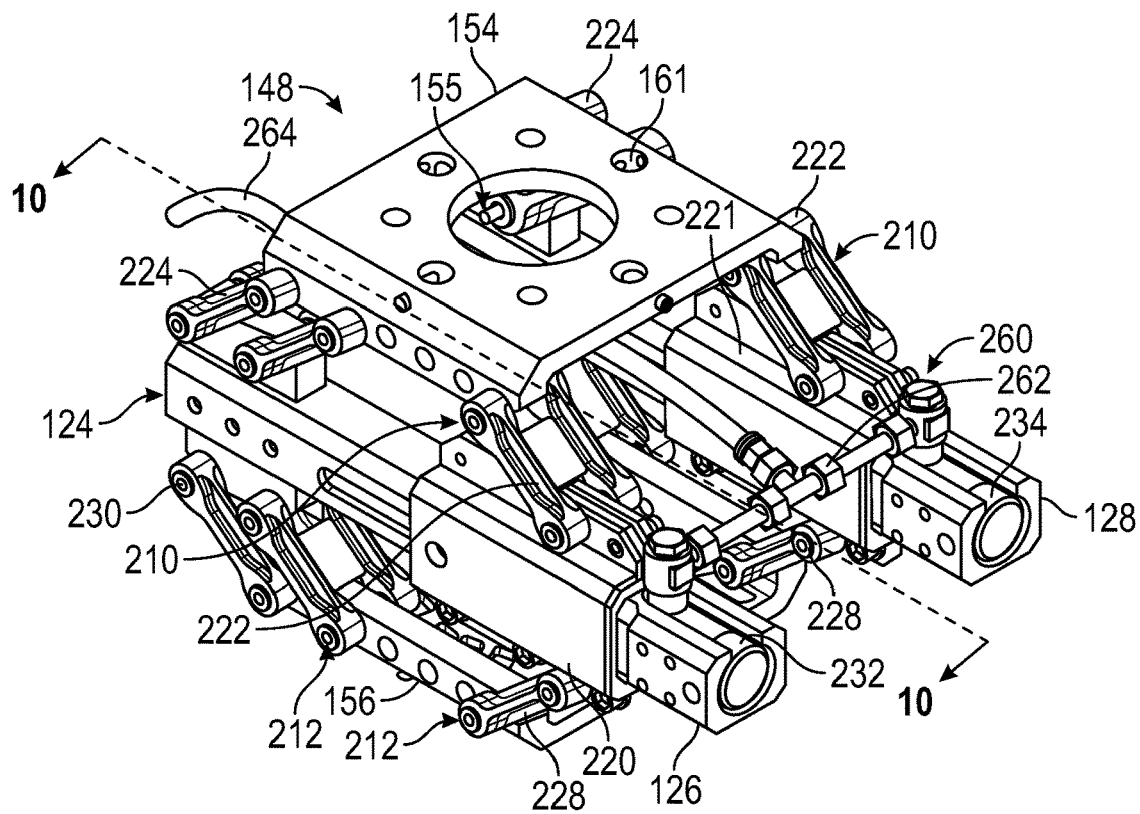
FIG. 6 is a top perspective view of a jack apparatus of the header delivery system in a retracted position according to embodiments of the present disclosure.
Figure 7:
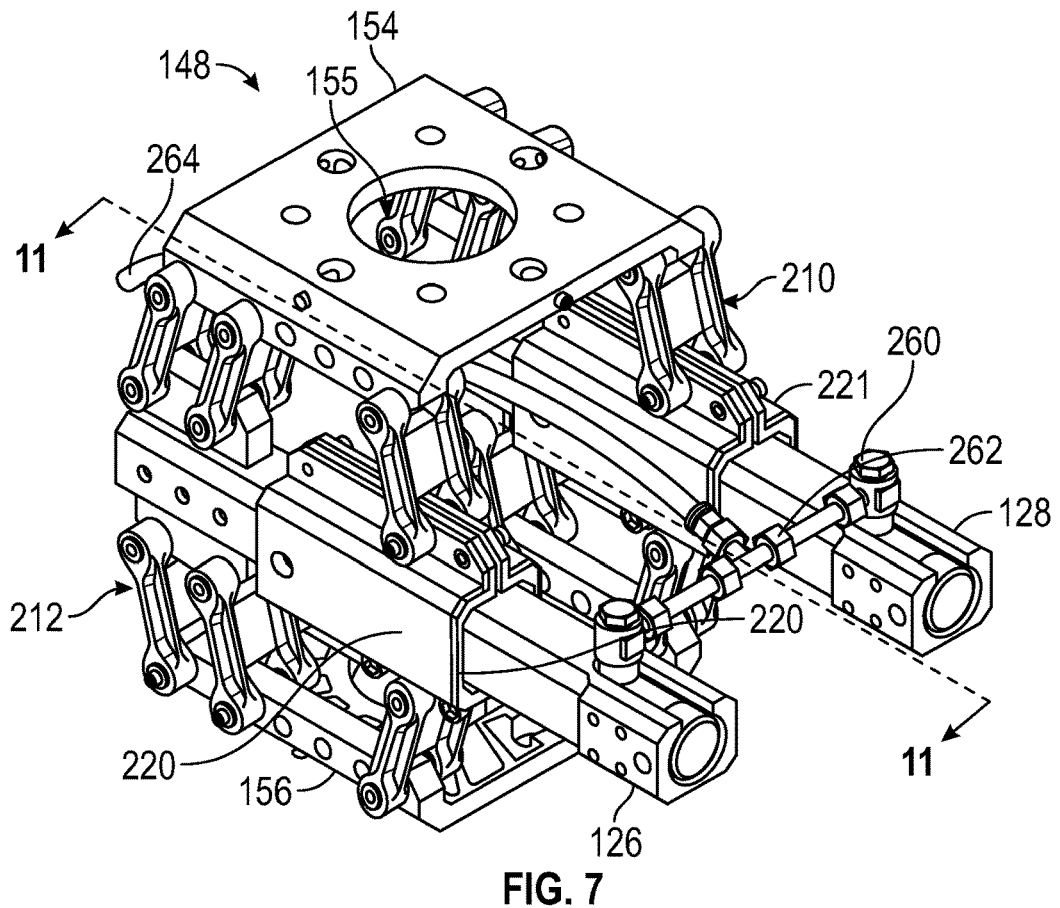
FIG. 7 is a top perspective view of the jack apparatus in an extended position according to embodiments of the present disclosure.

A first linear actuator 232, shown in FIGS. 6-7, is mounted to the frame apparatus 124 in a first axial configuration and connected to the first carrier member 220 of the first extension assembly 210 and the second extension assembly 212. First linear actuator 232 is connected to the first carrier member 220 with a connector member 236 and slidably moves the first carrier member 220 in a first axial direction parallel to the first axis 122 to move the tube coupler 120 and bumper 132 from a retracted position to an extended position. The movement of the first carrier member 220 in the first axial direction is depicted by arrows 240. The first linear actuator 232 is configured to provide a first axial force in a first axial direction to the first extension assembly 210 and the second extension assembly 212. First extension assembly 210 uses the first axial force for moving the tube coupler 120 from a first retracted position to a first extended position. Second extension assembly 210 uses the first axial force for moving the bumper 132 from a second retracted position to a second extended position.

Figure 5:
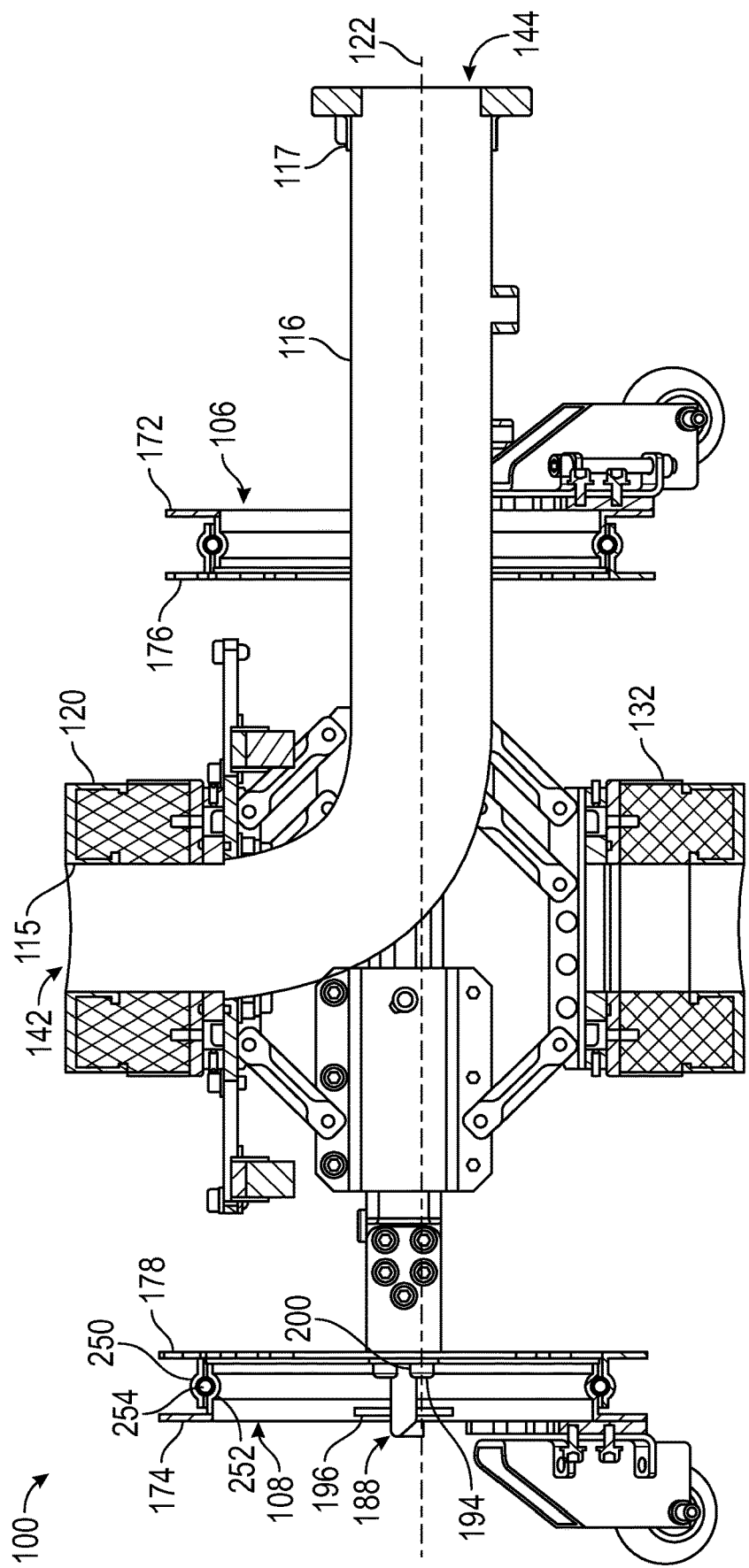
FIG. 5 is a cross-sectional view of the header delivery system take taken along lines 4-4 of FIG. 3.

Referring to FIG. 5, a cross-section of the header delivery system 100 is shown. Second rotational ring 178 is rotatably coupled to the second stationary ring 174. Second rotational ring 178 has a first external lip 250 that has a ring shape and extends around the body of the second rotational ring 178.

Second stationary ring 174 has a second external lip 252 that has a ring shape and extends around the body of the second stationary ring 174 First external lip 250 and the second external lip overlap and the first external lip 250 is rotatable around the second external lip 252 to enable rotation of the second rotational ring 178 around the second stationary ring 174. A bearing 254 may be disposed between the external lips 250, 252.

Third locking apparatus 188 is shown in a locking position to secure the second rotational ring 178 in a selected angular position with respect to the second stationary ring 174. Pin 200 of the third locking apparatus 188 extends through a ring lock slot 194 in the second rotational ring 174. The locking position blocks the second rotational ring 178 from rotating with respect to the second stationary ring 174. First rotational ring 176 is rotatably coupled to the first stationary ring 172 of the first rotation apparatus 106 in a similar manner as described with respect to the second rotation apparatus 108.

Launcher pipe 116 extends from a first pipe end 115 to a second pipe end 117. First pipe end 115 forms the first pipe opening 142 and the second pipe end 117 forms the second pipe opening 144. First pipe end 115 extends through the tube coupler 120. Tube coupler 120 forms a seal around the first pipe end 115.

Referring to FIG. 6 and FIG. 7, a top perspective view of the jack apparatus 148 connected to the frame apparatus 124 is shown. First mounting plate 154 has a first mount opening 155. Mount opening 155 is configured for the launcher pipe 116, not shown in FIG. 6 and FIG. 7, to extend through the mount opening 155, as shown in FIG. 5. Fastener openings 161 may be used to connect the tube coupler 120 to the first mounting plate 154. Mechanical fasteners, such as bolts, and the fastener openings 161 may be used to connect the tube coupler 120 to the first mounting plate 154.

Jack apparatus 148 is in a retracted position in FIG. 6 and is in an extended position in FIG. 7. Jack apparatus 148 includes the first linear actuator 232 mounted on the first frame member 126 and the second linear actuator 234 mounted on the second frame member 128. Linear actuators 232, 234 are hydraulically powered and a hydraulic apparatus 260 is connected thereto. Hydraulic apparatus 260 includes an actuator tubing 262 that connects to each of the linear actuators 232, 234 and a fluid conduit formed by an actuator hose 264 connected to the actuator tubing 262. Actuator hose 264 may be connected to a hydraulic pump for actuating the linear actuators 232, 234.

Linear actuators 232, 234 may be actuated to position the jack apparatus 148 from the retracted position, shown in FIG. 6, to the extended position, shown in FIG. 7. Linear actuators 232, 234 are hydraulically actuated via the actuator hose 264 that may extend along the launcher pipe 116, shown in FIG. 1. When the linear actuators 232, 234 are hydraulically actuated, the linear actuators 232, 234 apply an axial force to the carrier members 220, 221 and the carrier members 220, 221 slidably move on respective frame members 126, 128. The sliding movement of the carrier members 220, 221 from a first carrier position, shown in FIG. 6, to a second carrier position, shown in FIG. 7, with respect to the respective frame members 126, 128 forces the first mounting plate 154 to move in a first radial direction from the frame apparatus 124 and forces the second mounting plate 156 to move in an opposite second radial direction from the frame apparatus 124 to the extended position, shown in FIG. 7.

First extension assembly 210 converts the axial force of the linear actuators 232, 234 to a first radial force in the first radial direction to move the first mounting plate 154 from the retracted position to the extended position. Second extension assembly 212 converts the axial force of the linear actuators 232, 234 to a second radial force in the second radial direction to move the second mounting plate 154 from the retracted position to the extended position. First mounting plate 154 and the second mounting plate 156 move in opposite radial directions in synchronization.

First extension assembly 210 is formed by the first carrier member 220 slidably connected on the first frame member 126, a second carrier member 221 slidably connected to the second frame member 128, the first carrier arms 222 pivotally connected to the first mounting plate 154, and the first pivot arms 224 pivotally connected to the first mounting plate 154. Second extension assembly 212 is formed by the first carrier member 220 slidably connected on the first frame member 126, the second carrier member 221 slidably connected to the second frame member 128, the second carrier arms 228 pivotally connected to the second mounting plate 156, and the second pivot arms 230 pivotally connected to the second mounting plate 156.

Figure 8:
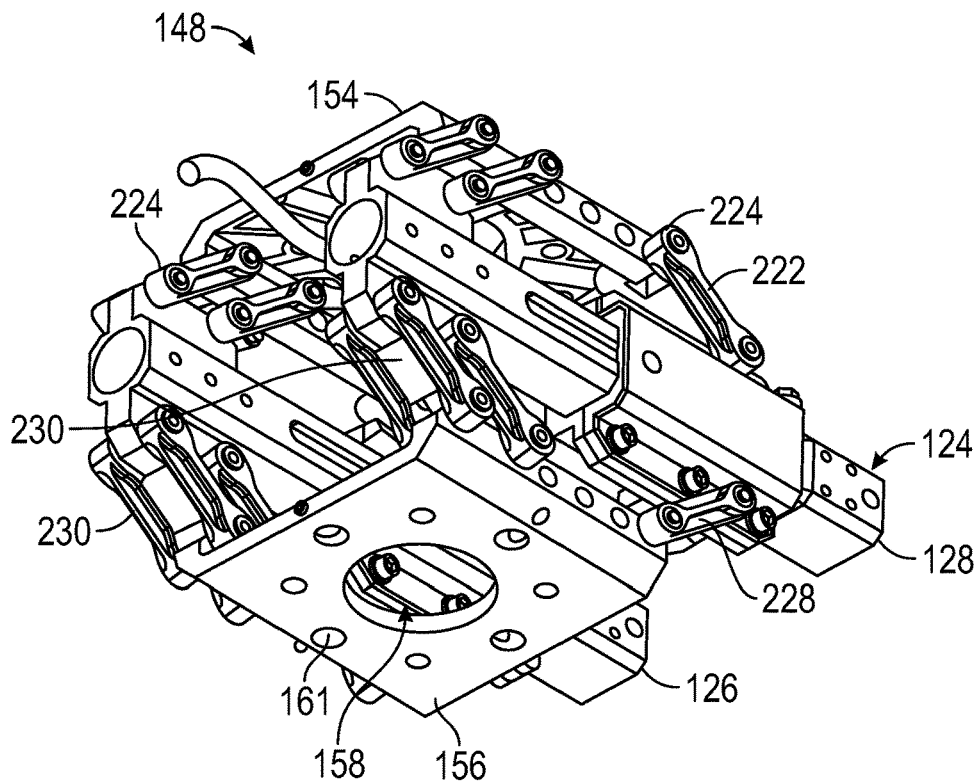
FIG. 8 is a bottom perspective view of the jack apparatus in the retracted position according to embodiments of the present disclosure.
Figure 9:
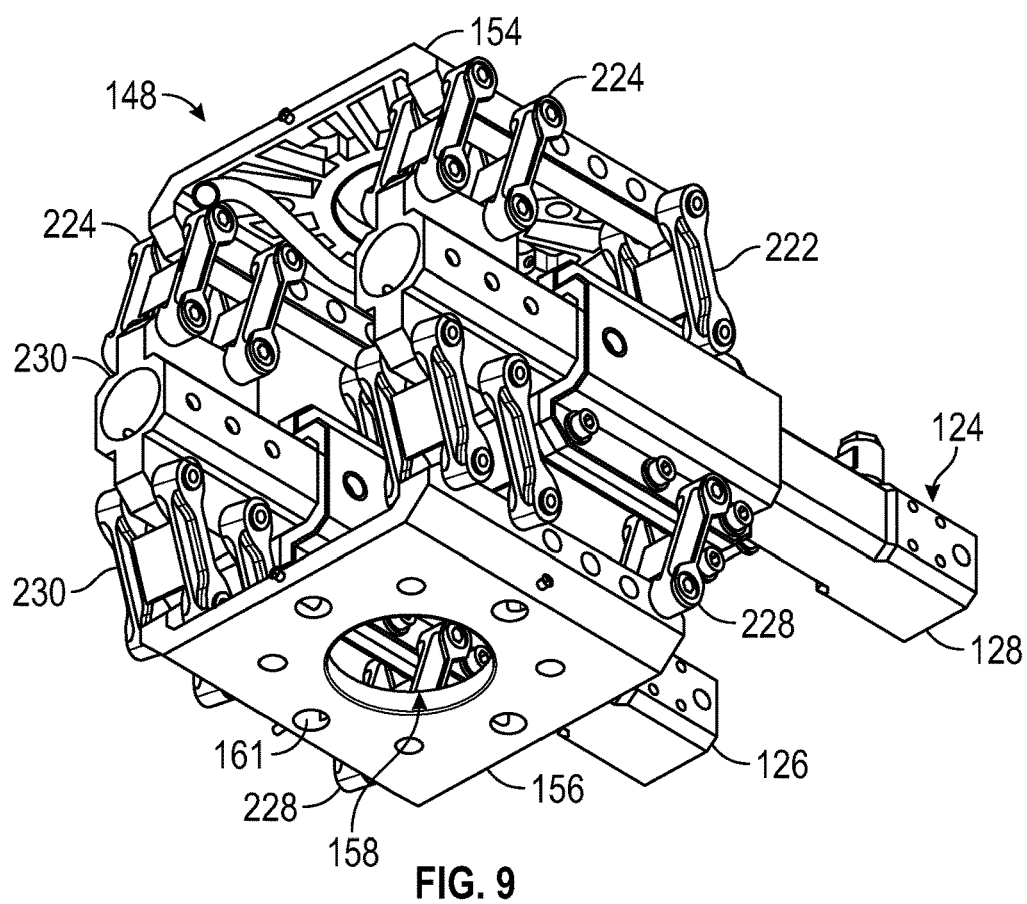
FIG. 9 is a bottom perspective view of the jack apparatus in the extended position according to embodiments of the present disclosure.

Referring to FIG. 8 and FIG. 9, a bottom perspective view of the jack apparatus 148 connected to the frame apparatus 124 is shown. Second mounting plate 156 is disposed below and the first mounting plate 154 is disposed above the frame members 124, 126. Second mounting plate 156 has a second mount opening 158. Fastener openings 161 may be used to connect the bumper 132 to the second mounting plate 156. Mechanical fasteners, such as bolts, and the fastener openings 161 in the second mounting plate 156 may be used to connect the bumper 132, shown in FIG. 2, to the second mounting plate 156.

Figure 10:
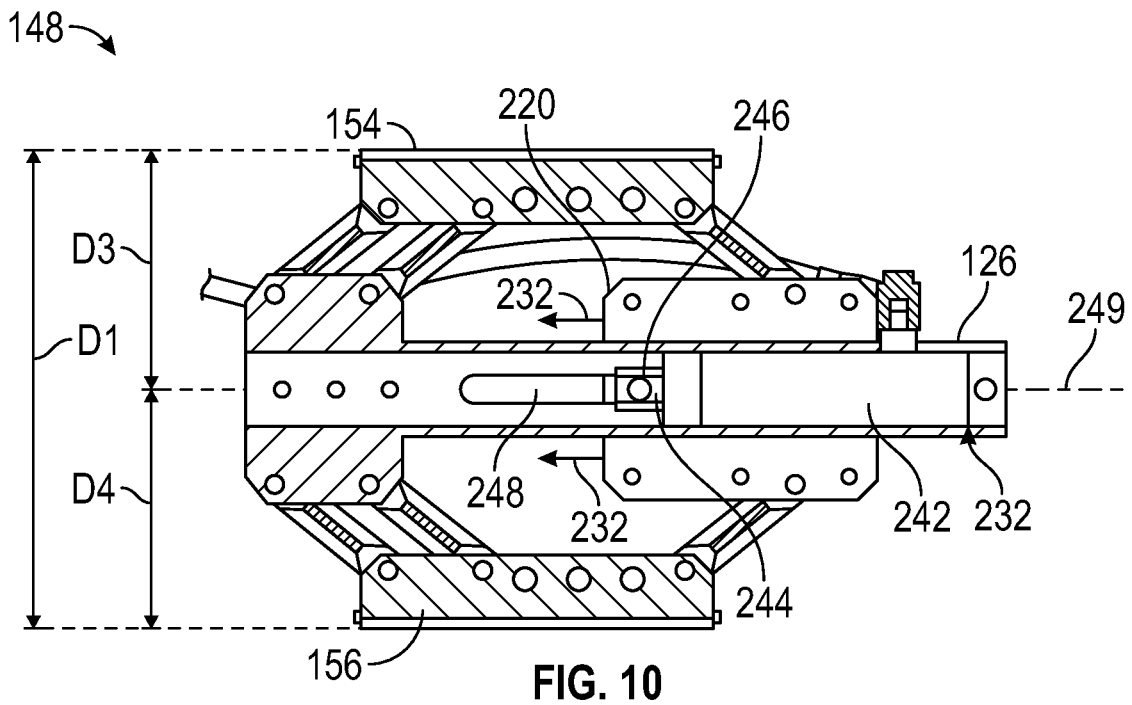
FIG. 10 is a cross-sectional view of the jack apparatus taken along lines 10-10 in FIG. 6.
Figure 11A:
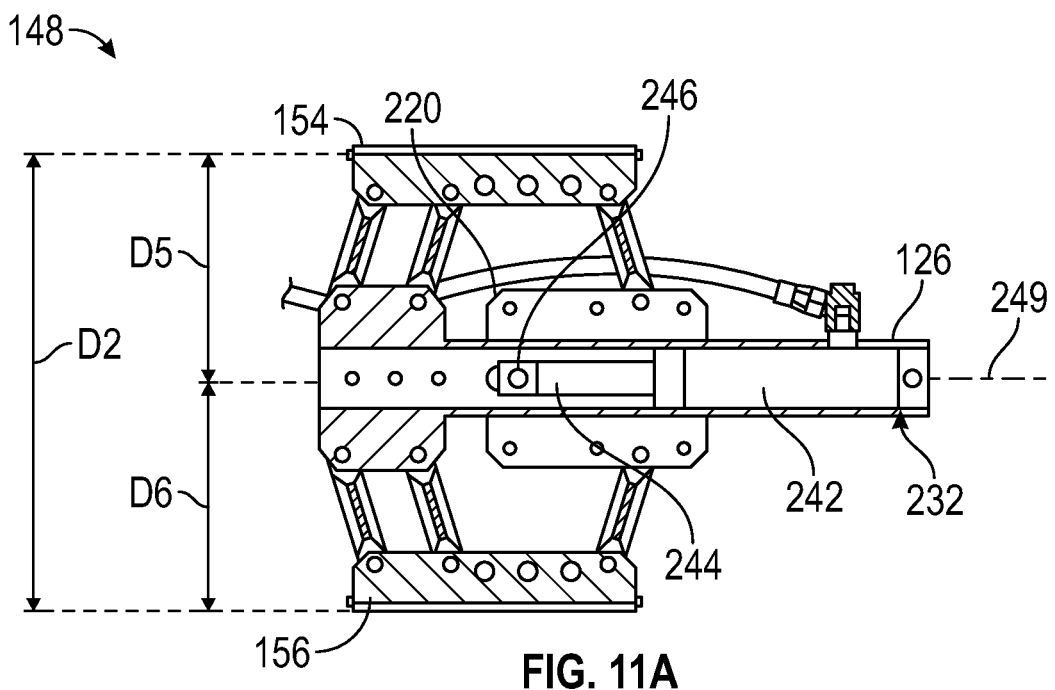
FIG. 11A is a cross-sectional view of the jack apparatus taken along lines 11-11 in FIG. 7.

Referring to FIG. 10 and FIG. 11A, cross-sectional views of the jack apparatus 148 are shown. Jack apparatus 148 is shown in the retracted position in FIG. 10 and in the extended position in FIG. 11A. First linear actuator 232 is connected to the first frame member 126 and is mounted inside the first frame member 126. First linear actuator 232 includes a cylinder 242 and a piston 244 attached at one end to the first carrier member 220. Piston 244 may be connected to an elongated member 246 that extends through a frame slot 248 that extends axially along the first frame member 126. Elongated member 246 may be attached to the first carrier member 220 by a connector member 236, shown in FIG. 4.

When the first linear actuator 232 in a retracted position is actuated, a hydraulic force in the cylinder 242 moves the piston 244 to slidably move the connected first carrier member 220 in a first axial direction along the first frame member 126, as depicted by arrows 232. First linear actuator 232 is positioned in an axial configuration to move the first carrier member 220 in the first axial direction. The first axial direction may be along a first frame axis 249 that extends through the first frame member 126. First frame axis 249 may be parallel to the first axis 122 extending through header delivery system 100 shown in FIG. 1. Piston 244 moves the carrier member 220 in the first axial direction to position the first mounting plate 154 and the second mounting plate 156 from a retracted position to an extended position.

When in the retracted position shown in FIG. 10, the distance between the first mounting plate 154 and the second mounting plate 156 is at a first distance D1. When in the extended position shown in FIG. 11A, the distance between the first mounting plate 154 and the second mounting plate 156 increases and is at a second distance D2. Distance D2 is greater than distance D1.

When in the retracted position shown in FIG. 10, the distance between the first mounting plate 154 and the first frame axis 249 is at a third distance $D_3$, and the distance between the second mounting plate 156 and the first frame axis 249 is at a fourth distance $D_4$. Distance $D_3$ and distance $D_4$ may be equal. When in the extended position shown in FIG. 11A, the distance between the first mounting plate 154 and the first frame axis 249 is at a fifth distance $D_5$, and the distance between the second mounting plate 156 and the first frame axis 249 is at a sixth distance $D_6$. Distance $D_5$ and distance $D_6$ may be equal. The tube coupler 120 connected to the first mounting plate 154 and the bumper 132 connected to the second mounting plate 156 have like distances between them as described above. For example, the distance between the tube coupler 120 and the bumper 132 increases when the jack apparatus 148 positions the header delivery system 100 from a retracted position to an extended position.

The jack apparatus 148 is configured to position the header delivery system 100 in a retracted position when moving a header delivery system 100 from an end opening in a header pipe to a selected location in the header delivery system 100 adjacent to a process tube connected to the header pipe. After the header delivery system 100 is positioned in the header pipe adjacent to the process tube, the jack apparatus 148 is configured to position the header delivery system 100 in an extended position to place the header delivery system 100 in an installed position. Further discussion of the operation of the header delivery system 100 is provided below, for example see FIG. 18.

Figure 11B:
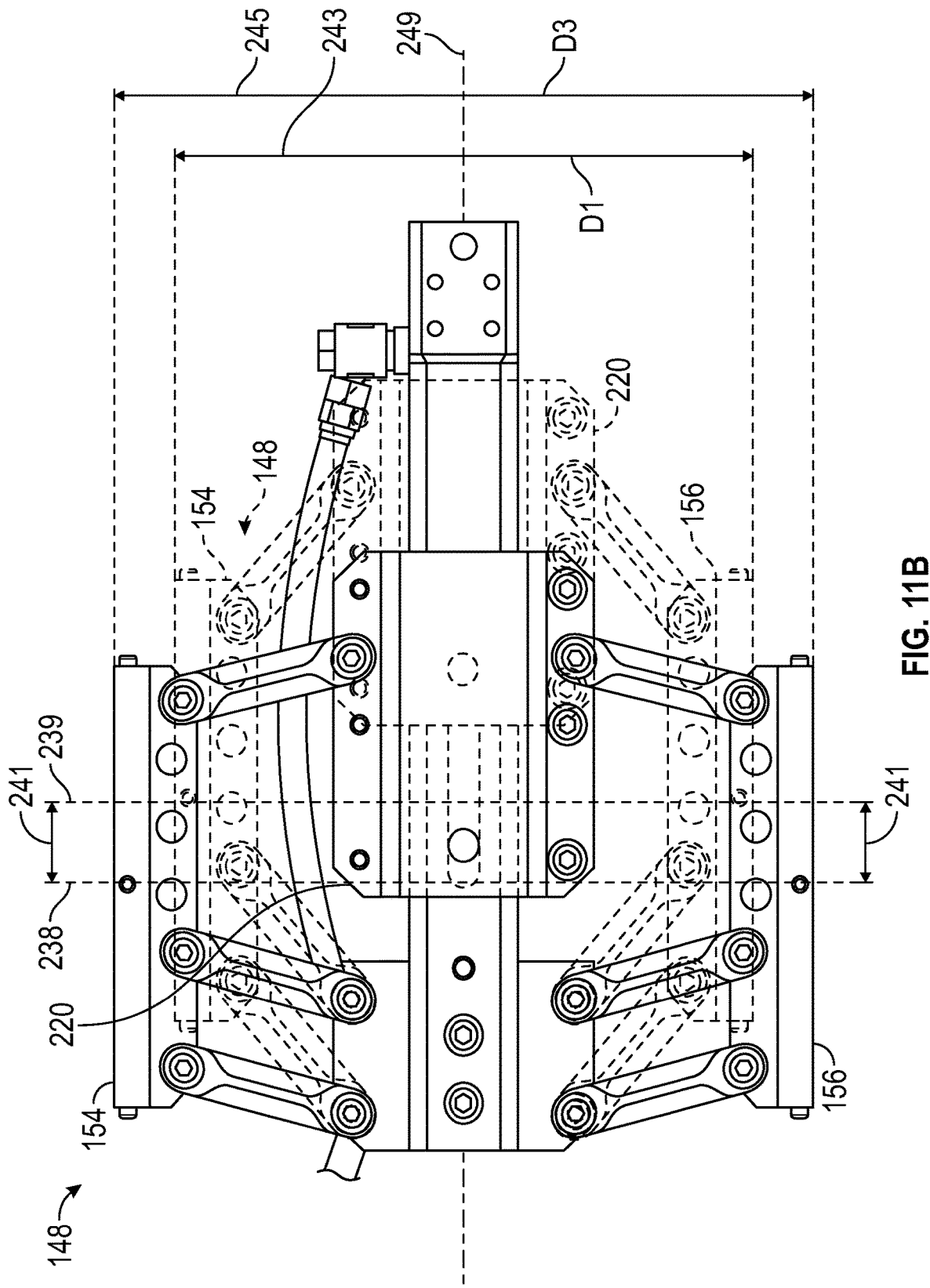
FIG. 11B is a side view of the jack apparatus showing the jack apparatus in the extended position and the retracted position according to embodiments of the present disclosure.

Referring to FIG. 11B, the jack apparatus 148 is shown in the extended position. Jack apparatus 148 is also shown in dashed lines when in the retracted position. An axis 238 extends through a center of the mounting plates 154, 156 when the jack apparatus 148 is in the extended position. Axis 238 may be a vertical axis and may be perpendicular to the axis 249. An axis 239 extends through a center of the mounting plates 154, 156 when the jack apparatus 148 is in the retracted position, as shown by dash lines depicting the jack apparatus in FIG. 11B. Mounting plates 154, 156 are shifted in a first axial direction when moving from the retracted position to the extended position and an opposite second axial direction when moving from the extended position to the retracted position, as depicted by arrows 241. As discussed with respect to FIG. 10 and FIG. 11A, the mounting plates 154, 156 and the connected tube coupler 120 and bumper 132 move in first and second radial directions, as depicted by arrows 243, 245.

Figure 12:
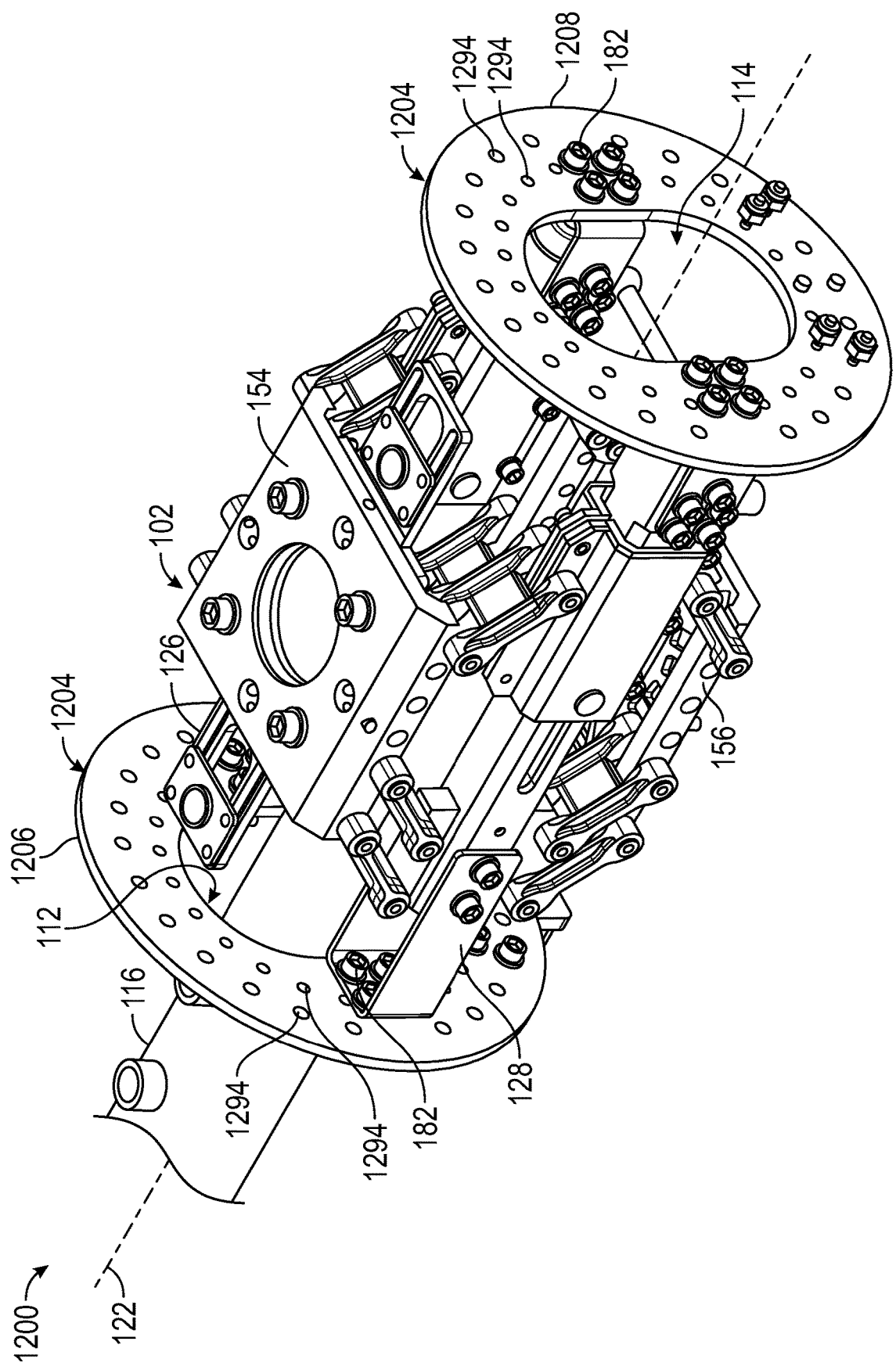
FIG. 12 is a perspective view of a header delivery system having an alternative rotation assembly according to embodiments of the present disclosure.
Figure 13:
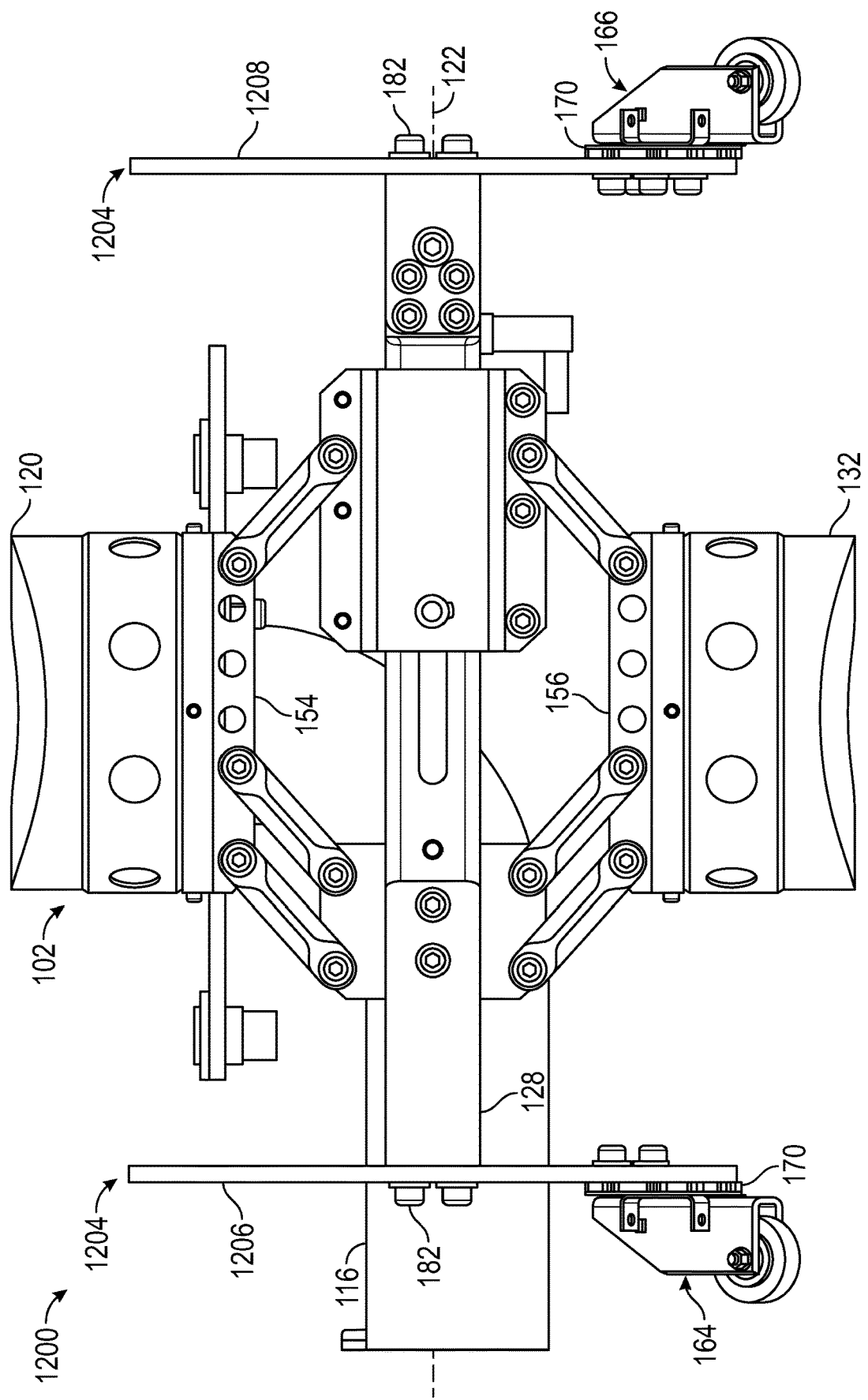
FIG. 13 is a side view of the header delivery system having the alternative rotation assembly according to embodiments of the present disclosure.
Figure 14:
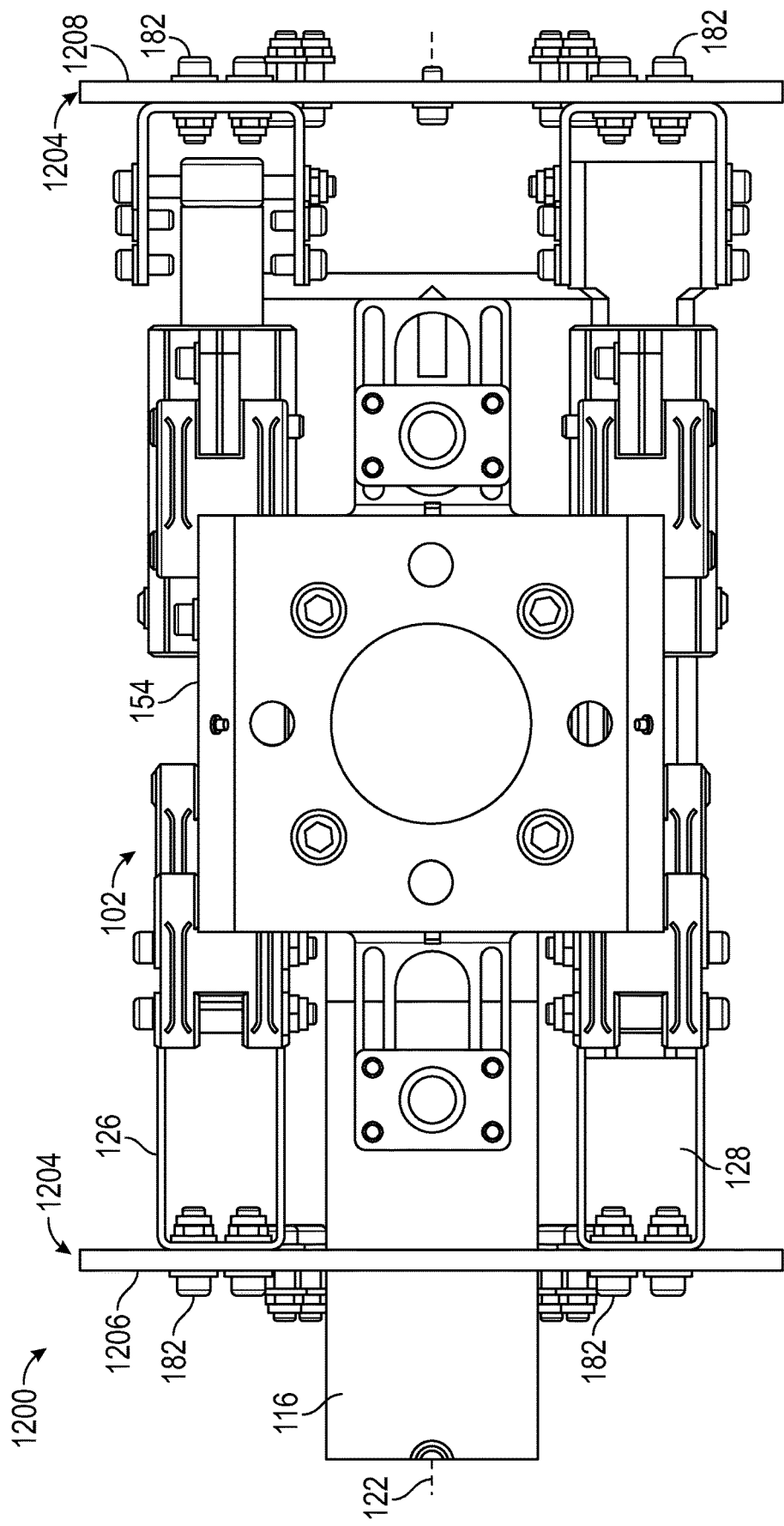
FIG. 14 is a top view of the header delivery system having the alternative rotation assembly according to embodiments of the present disclosure.

Referring to FIGS. 12-14, an alternative embodiment of a header delivery system is shown and identified with reference number 1200. In FIG. 12 and FIG. 14, the header delivery system 1200 is shown with the tube coupler 120, the bumper 132, and the wheel support plate 170 removed to help show components of the base assembly 102. In FIG. 13, the tube coupler 120, the bumper 132, and the wheel support plates 170 are shown connected in the assembled position. Header delivery system 1200 is like the header delivery system 100 with an alternative embodiment of the rotation assembly identified with reference number 1204. Like parts of alternative embodiments of the header delivery systems 100, 1200 are identified with like reference numbers. Header delivery system 1200 includes a base assembly 102 connected to a rotation assembly 1204 formed by a first rotation apparatus 1206 and a second rotation apparatus 1208 spaced from one another. First rotation apparatus 1206 has a first ring opening 112 and the second rotation apparatus 1208 has a second ring opening 114. Base assembly 102 is attached between the rotation apparatuses 1206, 1208. As shown in FIG. 13, a wheel support plate 170 is attached to each of the rotation apparatuses 1206, 1208, and the first wheel apparatus 164 is attached to the first rotation apparatus 1206 and the second wheel apparatus 166 is attached to the second rotation apparatus 1208.

Rotation apparatuses 1206, 1208 each may be formed by a single ring. Rotation apparatuses 1206, 1208 each have a plurality of connector openings 1294 that extend around the periphery of the ring openings 112, 114. Frame members 126, 128 are shown in FIGS. 12-14 connected to the rotation apparatuses 1206, 1208 at opposite ends to position the base assembly at a selected angular position. Mechanical fasteners, such as bolts 182, may be used to connect the rotation apparatuses 1206, 1208 to the frame members 126, 128.

Base assembly 102 may be rotated with respect to the first axis 122 to position the tube coupler 120 and the bumper 132, shown in FIG. 13, in a plurality of different angular positions with respect to the first axis 122. Rotation apparatuses 1206, 1208 may remain stationary as the base assembly 102 is rotated from a first angular position to a second angular position. Bolts 182 and connector openings 1294 extending around the periphery of each of the ring openings 112, 114 may be used to adjustably position the base assembly 102 in a first angular position and a second angular position.

In FIGS. 12-14, base assembly 102 is shown in a first angular position with the ends of the frame members 126, 128 attached to the rotation apparatuses 1206, 1208. Bolts 182 extend through bolt connectors 1294 on the rotation apparatuses 1206, 1208 and adjacent to the ends of the frame members 126, 128 to connect the base assembly 102 to the stationary rotation apparatuses 1206, 1208 in the first angular position. To position the base assembly 102 from the first angular position to a second angular position, the bolts 182 are detached from the frame members 126, 128 and the detached base assembly 102 is rotated to the second angular position. Bolts 182 may be extended through bolt connectors 1294 on the rotation apparatuses 1206, 1208 and adjacent to the ends of the rotated frame members 126, 128 to connect the base assembly 102 to the stationary rotation apparatuses 1206, 1208 in the second angular position. Adjusting the angular position of the base assembly 102 adjusts the angular position of the connected tube coupler 102 and the connected bumper 132.

Figure 17:
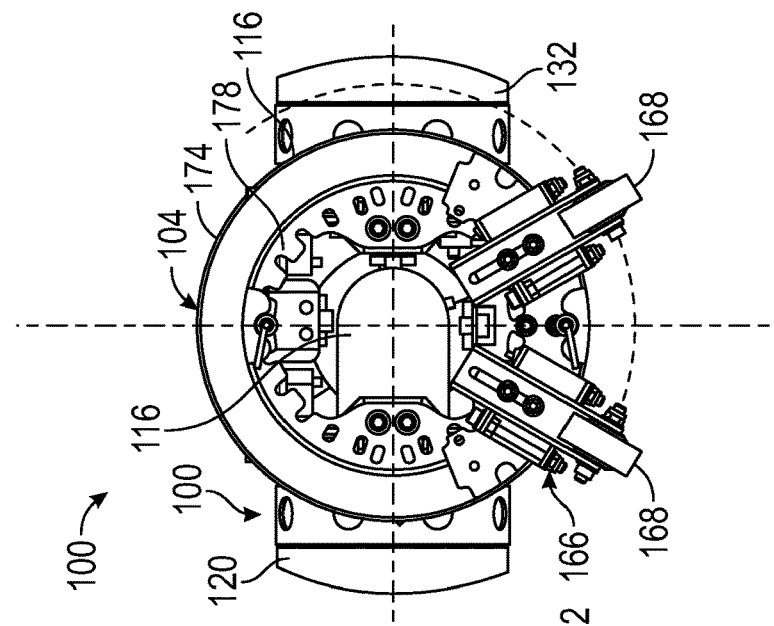
FIG. 17 is a back view of the header delivery system in a third angular position according to embodiments of the present disclosure.
Figure 16:
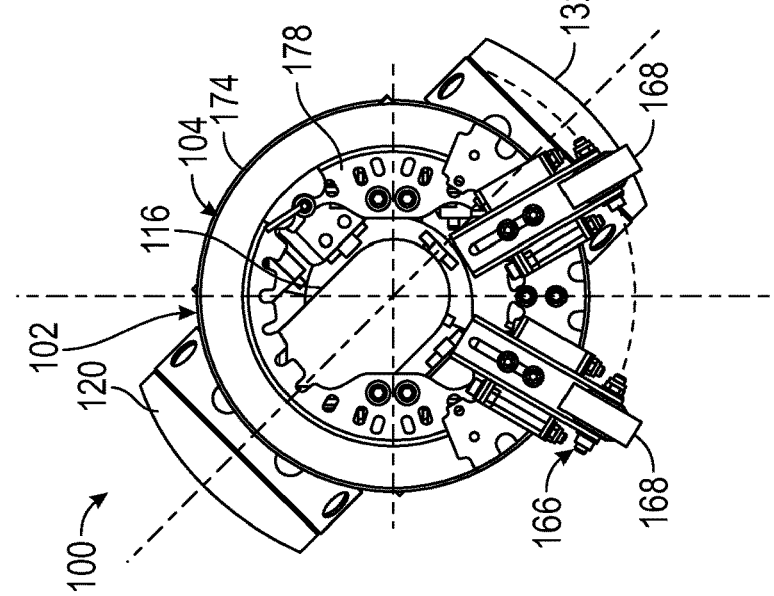
FIG. 16 is a back view of the header delivery system in a second angular position according to embodiments of the present disclosure.
Figure 15:
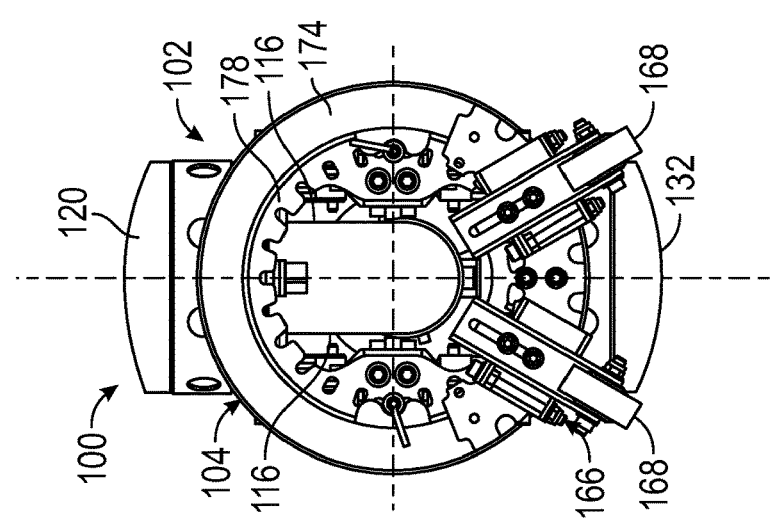
FIG. 15 is a back view of the header delivery system in a first angular position according to embodiments of the present disclosure.

Referring to FIGS. 15-17, a back view of the header delivery system 100, also shown in FIG. 3, is shown in three different angular positions. Rotation assembly 104 is configured to rotate the base assembly 102 and the tube coupler 120 and the bumper 132 connected to the base assembly 102 to a plurality of angular positions. In FIG. 15, the tube coupler 120 and the bumper 132 is shown in a zero degree angular position. The zero degree angular position may be referred to as a vertical angular position. In FIG. 16, the tube coupler 120 and the bumper 132 is shown in a forty-five degree angular position. In FIG. 17, the tube coupler 120 and the bumper 132 is shown in a ninety degree angular position. The ninety degree angular position may be referred to as a horizontal angular position. The tube coupler 120 and the bumper 132 may be rotated in a plurality of angular positions to position the tube coupler 120 and the bumper 132 in a selected angular position to couple with a process tube that may be connected at different angular positions to a header pipe.

Figure 18:
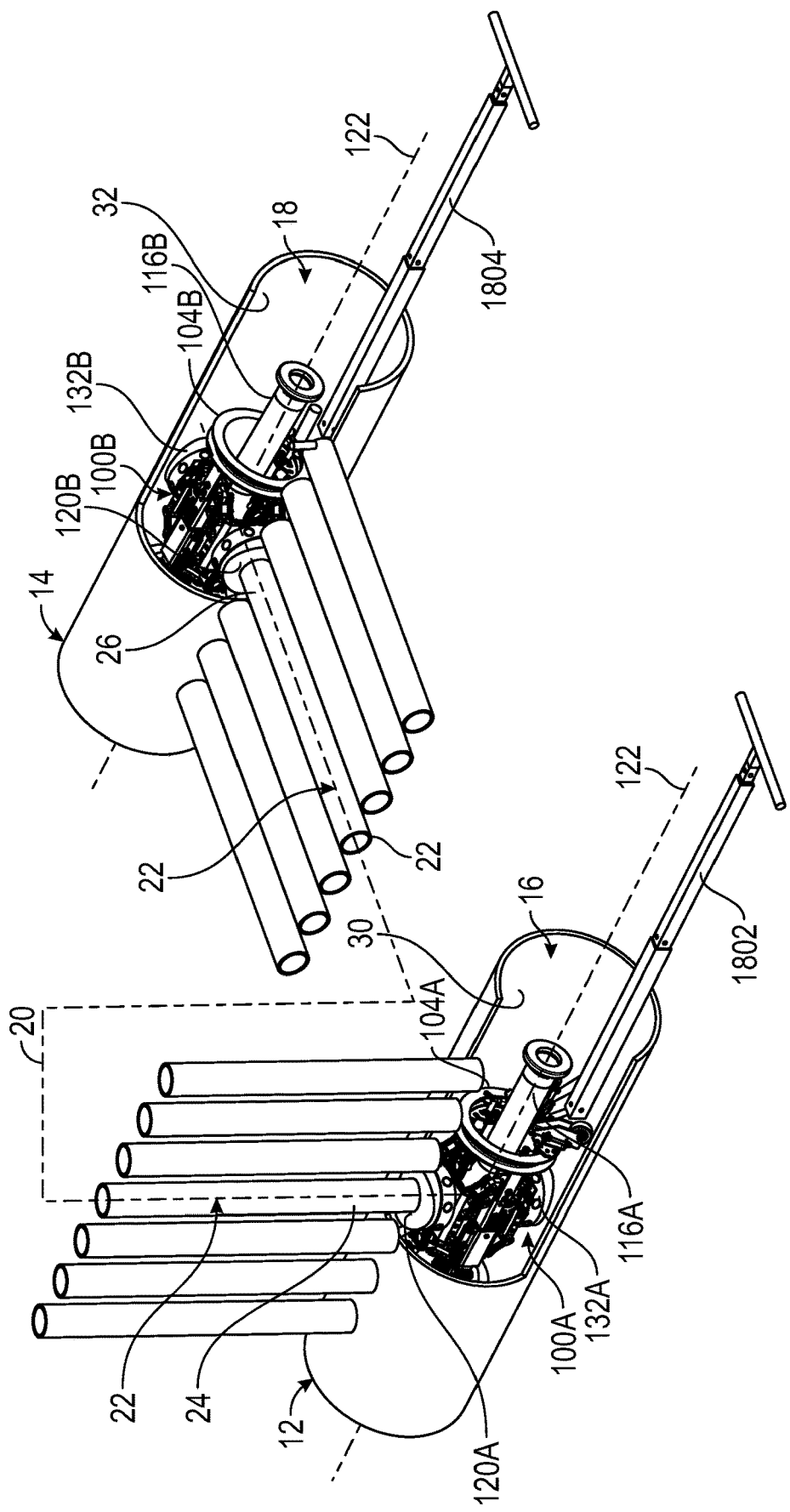
FIG. 18 is a perspective view of a first header delivery system in an installation position in a first header pipe and a second header delivery system in the installation position in the second header pipe according to embodiments of the present disclosure.

Referring to FIG. 18, a first header delivery system 100A is shown in an inlet header pipe 12 and a second header delivery system 100B is shown in an outlet header pipe 14. Inlet header pipe 12 has a cut-away section in a first side wall 30 and the outlet header pipe 14 has a cut-away section in a second side wall 32 to illustrate the header delivery systems 100A, 100B. First header delivery system 100A has a first position bar 1802 attached to a first rotation assembly 104A on the first header delivery system 100A. Second header delivery system 100B has a second position bar 1804 attached to a second rotation assembly 104B on the second header delivery system 100B. Position bars 1802, 1804 each may be used to position a header delivery systems 100A, 100B in the header pipes 12, 14 by pushing or pulling on a position bar 1802, 1804. The header delivery systems 100A, 100B may be positioned when the tube couplers 120A, 120B are in a retracted position to align the header delivery systems 100A, 100B with the process tube 22 to be sealed. A retracted position is selected for the header delivery systems 100A, 100B so that the height of the header delivery systems 100A, 100B is less than the internal diameter of the respective header pipe 12, 14 to allow the header delivery systems 100A, 100B to be axially moved into an alignment position with the process tube 22 to be sealed.

Inlet header pipe 12 has a first header pipe opening 16 and the outlet header pipe 14 has a second header pipe opening 18. A process tube 22 extends between the inlet header pipe 12 and the outlet header pipe 14 as shown by line 20. As shown in FIG. 18, a plurality of process tubes may extend between the inlet header pipe 12 and the outlet header pipe 14. Seven process tubes are shown in FIG. 18.

Process tube 22 has a first tube end 24 that connects to the inlet header pipe 12 at a fluid opening in the first side wall 30. Process tube 22 has a second tube end 26 that connects to the second outlet header pipe 14 at a fluid opening in the second side wall 32. First tube end 24 is connected to the inlet header pipe 12 at a first angular position and the second tube end 24 is connected to the outlet header pipe 14 at a second angular position. The first angular position of the first tube end 24 may be a zero degree angular position with respect to first axis 122, as shown in FIG. 18. The second angular position of the second tube end 26 may be a ninety degree angular position with respect to the first axis 122, as shown in FIG. 18. Header pipes 12, 14 may have a cylindrical shape.

First header delivery system 100A is in an extended position and is at a first angular position. In this first angular position, the first tube coupler 120A and the first bumper 132A has a first angular position that corresponds to the first tube angular position of the first tube end 24 of the first process tube 22, as shown in FIG. 18. In this extended position, the first header delivery system 100A is aligned with the first process tube 22. First tube coupler 120A and bumper 132A are each pressed against opposite sides of the internal diameter of the side wall 30 to form a seal between the first tube coupler 120A and the process tube 22. In more detail, the tube coupler 100A is positioned against the internal diameter of the first side wall 30 to form a seal around the fluid opening in the first side wall 30, and the bumper 132A is positioned opposite the first tube coupler 120A against the internal diameter of the first side wall 30. First coupler tube 120A and first bumper 130A press against the internal diameter of the first header pipe 12 to secure the first header delivery system 100A in an installed position in the first header pipe 12 where the tube coupler 120A is sealed to the process tube 22.

Second header delivery system 100B is in an extended position and is at a second angular position. In this second angular position, the second tube coupler 120B and the second bumper 132B has a second angular position that corresponds to the second tube angular position of the first tube end 24 of the first process tube 22, as shown in FIG. 18. In this extended position, the second header delivery system 100B is aligned with the first process tube 22. Second tube coupler 120B and second bumper 132B are each pressed against opposite sides of the internal diameter of the second side wall 32 to form a seal between the second tube coupler 120B and the process tube 22. In more detail, the second tube coupler 100B is positioned against the internal diameter of the second side wall 32 to form a seal around the fluid opening in the second side wall 32, and the second bumper 132B is positioned opposite the second tube coupler 120B against the internal diameter of the second side wall 32. Second coupler tube 120B and second bumper 132B press against the internal diameter of the second header pipe 14 to secure the second header delivery system 100B in an installed position in the second header pipe 14 where the second tube coupler 120B is sealed to the process tube 22.

Figure 19:
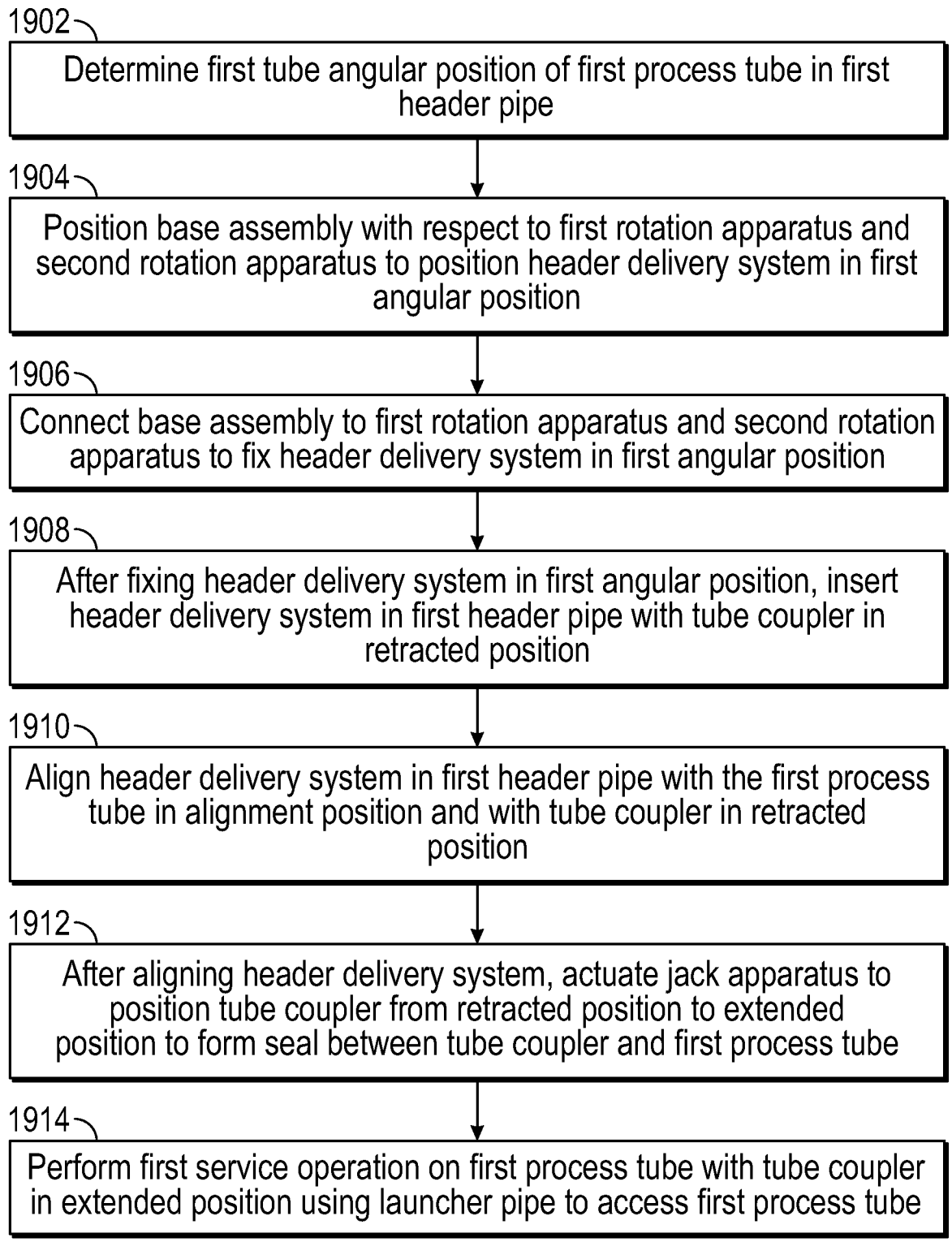
FIG. 19 is a flowchart of an operation using a header delivery system according to embodiments of the present disclosure.

In operation, a method of accessing a process tube extending from a header pipe may be performed using a header delivery system of the present disclosure. Referring to the flowchart shown in FIG. 19, a user may determine a first tube angular position of a first process tube in a first header pipe [block 1902]. The user may determine the first tube angular position of the first process tube using information, such as equipment plans. In addition, the user may visually or use cameras to determine the first tube angular position.

The base assembly may be positioned with respect to the first rotation apparatus and the second rotation apparatus to position the header delivery system in a first angular position [block 1904]. For example, the base assembly may be rotated to the first angular position with the rotation apparatuses each having a stationary ring that allows the base assembly to be rotated while the stationary ring remains relatively stationary. The base assembly may be connected to the first rotation apparatus and the second rotation apparatus to fix the header delivery system in the first angular position [block 1906]. After fixing the header delivery system in the first angular position, the header delivery system may be inserted in the first header pipe with the tube coupler in a retracted position [block 1908].

The header delivery system may be aligned in the first header pipe with the first tube coupler in an alignment position and with the tube coupler in the retracted position [block 1910]. After aligning the header delivery system, the jack apparatus may be actuated to position the tube coupler from the retracted position to the extended position to form a seal between the tube coupler and the first process tube [block 1912]. A first service operation may be performed on the first process tube with the tube coupler in the extended position using the launcher pipe to access the first process tube [block 1914].

After the first service operation is performed, the jack apparatus may be de-actuated to remove hydraulic pressure from the jack apparatus and position the tube coupler from the extended position to the retracted position. The retracted position may be any position of the tube coupler where hydraulic pressure has been reduced to allow the tube coupler to move away from an extended position and towards a retracted position. The extended position may be any position of the tube coupler where the tube coupler has been extended to seal with a process tube. The header delivery system may be removed from the first header pipe after the jack apparatus has been de-actuated. After removal from the first header pipe, the angular position of the header delivery system may be adjusted for another process tube on the first header pipe or a different header pipe. The adjusted header delivery system may be used on the first header pipe or a second header pipe with another process tube connected to a header pipe at a different angular position, as described previously.

The header delivery system provides a universal header delivery system that allows for convenient adjustment of the angular position of the base assembly to allow a tube coupler to seal with a process tube at a tube angular position with respect to the header pipe. In addition, the jack apparatus provides linear actuators that are mounted adjacent the frame members to provide a compact jack apparatus and header delivery system that may be used for header pipes of different sizes.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A header delivery system for a header pipe having a process tube extending from the header pipe, comprising:
    a base assembly coupled to a rotation assembly;
    the base assembly including:
        a launcher pipe having a first pipe end and a second pipe end, the first pipe end having a first launcher pipe opening and the second pipe end having a second launcher pipe opening;
        a tube coupler connected to the first launcher pipe opening;
        a first frame member coupled to the launcher pipe and having a first frame end and a second frame end; and
        a jack apparatus connected to the tube coupler and configured to adjustably position the tube coupler; and
    the rotation assembly including:
        a first rotation apparatus connected to the first frame member at the first frame end, wherein the first rotation apparatus includes a first stationary ring and a first rotational ring connected to the first frame end and rotatably coupled to the first stationary ring; and
        a second rotation apparatus connected to the first frame member at the second frame end,
        the first rotation apparatus and the second rotation apparatus configured to position the base assembly with respect to the rotation assembly to adjust an angular position of the base assembly.

2. The header delivery system of claim 1, wherein the second rotation apparatus includes a second stationary ring and a second rotational ring connected to the second frame end and rotatably coupled to the second stationary ring, and wherein the first rotational ring and the second rotational ring are configured to be rotated together to adjustably position the angular position of the base assembly and the tube coupler.

3. The header delivery system of claim 2, wherein the first rotation apparatus has a first locking apparatus configured to selectively fix the first rotational ring to the first stationary ring and the second rotation apparatus has a second locking apparatus for selectively fixing the second rotational ring to the second stationary ring, and wherein the first locking apparatus and the second locking apparatus are configured to adjustably fix the base assembly and the tube coupler in a plurality of angular positions.

4. The header delivery system of claim 2, wherein the first rotational ring and the first stationary ring form a first ring opening and the second rotational ring and the second stationary ring form a second ring opening, and wherein the second launcher pipe opening extends through the first ring opening.

5. A header delivery system for a header pipe having a process tube extending from the header pipe, comprising:
    a base assembly coupled to a rotation assembly;
    the base assembly including:
        a launcher pipe having a first pipe end and a second pipe end, the first pipe end having a first launcher pipe opening and the second pipe end having a second launcher pipe opening;
        a tube coupler connected to the first launcher pipe opening;
        a first frame member coupled to the launcher pipe and having a first frame end and a second frame end; and
        a jack apparatus connected to the tube coupler and configured to adjustably position the tube coupler; and
    the rotation assembly including:
        a first rotation apparatus connected to the first frame member at the first frame end; and
        a second rotation apparatus connected to the first frame member at the second frame end, wherein the first rotation apparatus includes a first stationary ring connected to the first frame end and second rotation apparatus includes a second stationary ring connected to the second frame end,
        the first rotation apparatus and the second rotation apparatus configured to position the base assembly with respect to the rotation assembly to adjust an angular position of the base assembly.

6. The header delivery system of claim 5, wherein the first frame member is configured to rotate the base assembly and be attached to the first stationary ring and the second stationary ring at a plurality of angular positions with respect to the first stationary ring and the second stationary ring, and wherein the first stationary ring has a plurality of first positioning fasteners extending around the perimeter of the first ring opening and a plurality of second positioning fasteners extending around the second ring opening, the plurality of first positioning fasteners and the plurality of second positioning fasteners configured to adjustably connect the frame assembly to the first stationary ring.

7. The header delivery system of claim 5, further comprising:
    a first wheel and a second wheel attached to the first rotation apparatus;
    a third wheel and a fourth wheel attached to the second rotation apparatus; and
    wherein the first wheel, the second wheel, the third wheel, and the fourth wheel are configured to axially roll the base assembly in the header pipe.

8. A header delivery system for a header pipe having a process tube extending from the header pipe, comprising:
a base assembly coupled to a rotation assembly;
the base assembly including:
a launcher pipe having a first pipe end and a second pipe end, the first pipe end having a first launcher pipe opening and the second pipe end having a second launcher pipe opening;
a tube coupler connected to the first launcher pipe opening;
a first frame member coupled to the launcher pipe and having a first frame end and a second frame end; and
a jack apparatus connected to the tube coupler and configured to adjustably position the tube coupler;
the rotation assembly including:
a first rotation apparatus connected to the first frame member at the first frame end; and
a second rotation apparatus connected to the first frame member at the second frame end,
the first rotation apparatus and the second rotation apparatus configured to position the base assembly with respect to the rotation assembly to adjust an angular position of the base assembly; and
a second frame member coupled to the launcher pipe and having a third frame end and a fourth frame end, and wherein the first rotation apparatus is connected to the second frame member at the third frame end and the second rotation apparatus is connected to the second frame member at the fourth frame end.

9. The header delivery system of claim 8, further comprising:
a bumper connected to the jack apparatus, wherein the jack apparatus is configured to move the tube coupler and the bumper between a retracted position and an extended position, and wherein the jack apparatus is configured to move the tube coupler in a first radial direction with respect to the first frame member and to move the bumper in an opposite second radial direction when the tube coupler and the bumper are moved from the retracted position to the extended position.

10. The header delivery system of claim 9, wherein the jack apparatus includes:
a first linear actuator having a first actuator end and a second actuator end and mounted to the first frame member in a first axial configuration and configured to apply a first axial force;
a first mounting plate connected to the tube coupler;
a second mounting plate connected to the bumper;
a first extension assembly connected to the first mounting plate;
a second extension assembly connected to the second mounting plate; and
wherein the first linear actuator is coupled to the first extension assembly and the second extension assembly and is configured to apply the first axial force to the first extension assembly to position the tube coupler and the bumper from the retracted position to the extended position.

11. The header delivery system of claim 10, wherein the jack apparatus includes:
a second linear actuator having a third actuator end and a fourth actuator end and mounted to the second frame member in a second axial configuration and configured to apply a second axial force;
a third extension assembly connected to the first mounting plate;
a fourth extension assembly connected to the second mounting plate;
wherein the second linear actuator is coupled to the third extension assembly and the fourth extension assembly and is configured to apply the second axial force to the first extension assembly and the second extension assembly to position the tube coupler and the bumper from the retracted position to the extended position; and
wherein the jack apparatus is configured to move the tube coupler and the bumper in a first axial direction with respect to the first frame member when the tube coupler and the bumper are moved from the retracted position to the extended position.

12. A method of accessing a process tube extending from a header pipe, using a header delivery system, the header delivery system including:
a base assembly coupled to a rotation assembly;
the base assembly including:
a launcher pipe having a first pipe end and a second pipe end, the first pipe end having a first launcher pipe opening and the second pipe end having a second launcher pipe opening,
a tube coupler connected to the first launcher pipe opening,
a first frame member coupled to the launcher pipe and having a first frame end and a second frame end; and
a jack apparatus connected to the tube coupler and configured to adjustably position the tube coupler,
the rotation assembly including:
a first rotation apparatus connected to the first frame member at the first frame end, and
a second rotation apparatus connected to the first frame member at the second frame end,
the first rotation apparatus and the second rotation apparatus configured to position the base assembly with respect to the rotation assembly to adjust an angular position of the base assembly and the tube coupler;
a second frame member coupled to the launcher pipe and having a third frame end and a fourth frame end, and wherein the first rotation apparatus is connected to the second frame member at the third frame end and the second rotation apparatus is connected to the second frame member at the fourth frame end; and
a bumper connected to the jack apparatus, wherein the jack apparatus is configured to move the tube coupler and the bumper between a retracted position and an extended position, and wherein the jack apparatus is configured to move the tube coupler in a first radial direction with respect to the first frame member and to move the bumper in an opposite second radial direction when the tube coupler and the bumper are moved from the retracted position to the extended position; and
the method comprising:
determining a first tube angular position of a first process tube in a first header pipe;
positioning the base assembly with respect to the first rotation apparatus and the second rotation apparatus to position the header delivery system in a first angular position;
connecting the base assembly to the first rotation apparatus and the second rotation apparatus to fix the header delivery system in the first angular position;

after fixing the header delivery system in the first angular position, inserting the header delivery system in the first header pipe with the tube coupler in a retracted position;

aligning the header delivery system in the first header pipe with the first process tube in an alignment position and with the tube coupler in a retracted position;

after aligning the header delivery system, actuating the jack apparatus to position the tube coupler from the retracted position to an extended position to form a seal between the tube coupler and the first process tube; and performing a first service operation on the first process tube with the tube coupler in the extended position using the launcher pipe to access the first process tube.

13. The method of claim 12, further comprising:

determining a second tube angular position of a second process tube in the first header pipe or a second header pipe;

after performing the service method on the first process tube, removing the header delivery system from the first header pipe with the header delivery system in the retracted position;

after removing the header delivery system from the first header pipe, positioning the base assembly with respect to the first rotation apparatus and the second rotation apparatus to position the header delivery system in a second angular position;

connecting the base assembly to the first rotation apparatus and the second rotation apparatus to fix the header delivery system in the second angular position;

after fixing the header delivery system in the second angular position, inserting the header delivery system in the first header pipe or the second header pipe with the tube coupler in the retracted position;

aligning the header delivery system in the first header pipe or the second header pipe with the second process tube and with the tube coupler in the retracted position;

after aligning the header delivery system, actuating the jack apparatus to position the tube coupler from the retracted position to the extended position to form a seal between the tube coupler and the second process tube; and performing a second service operation on the second process tube coupled to the header delivery system using the launcher pipe for access to the second process tube.

14. A header delivery system for a header pipe having a process tube extending from the header pipe, comprising:

a base assembly coupled to a rotation assembly;

the base assembly including:
  a first frame member having a first frame end and a second frame end,
  a second frame member spaced apart from the first frame member and having a third frame end and a fourth frame end,
  a jack apparatus connected between the first frame member and the second frame member,
  a launcher pipe connected to the jack apparatus,
  a tube coupler connected to the jack apparatus,
  a bumper connected to the jack apparatus, and
  wherein the jack apparatus is configured to adjustably move the tube coupler and the bumper in opposite radial directions when moving between a retracted position and an extended position; and the rotation assembly including:
  a first rotation apparatus connected to the first frame member at the first frame end and the second frame member at the third frame end, and
  a second rotation apparatus connected to the first frame member at the second frame end and the second frame member at a fourth frame end, and the first rotation apparatus and the second rotation apparatus configured to rotate the base assembly with respect to the rotation assembly to adjust an angular position of the tube coupler and the bumper.

15. The header delivery system of claim 14, wherein the first rotation apparatus includes a first stationary ring and a first rotational ring connected to the first frame end and rotatably coupled to the first stationary ring.

16. The header delivery system of claim 15, wherein the second rotation apparatus includes a second stationary ring and a second rotational ring connected to the second frame end and rotatably coupled to the second stationary ring, and wherein the first rotational ring and the second rotational ring are configured to be rotated together to adjustably position the angular position of the base assembly and the tube coupler.

17. The header delivery system of claim 16, wherein the first rotation apparatus has a first locking apparatus configured to selectively fix the first rotational ring to the first stationary ring and the second rotation apparatus has a second locking apparatus for selectively fixing the second rotational ring to the second stationary ring, and wherein the first locking apparatus and the second locking apparatus are configured to adjustably fix the base assembly and the tube coupler in a plurality of angular positions.

18. The header delivery system of claim 17, wherein the first rotational ring and the first stationary ring form a first ring opening and the second rotational ring and the second stationary ring form a second ring opening, and wherein the second launcher pipe opening extends through the first ring opening.

* * * * *